US008966524B2

(12) United States Patent
Van Gulik

(10) Patent No.: US 8,966,524 B2
(45) Date of Patent: Feb. 24, 2015

(54) METHOD OF ASSOCIATING PROGRAM CONTENT DATA IN A DIGITAL TELEVISION NETWORK

(75) Inventor: Dirk-Willem Van Gulik, Leiden (NL)

(73) Assignee: Baaima N.V., Curaçao (NL)

( * ) Notice: Subject to any disclaimer, the term of this patent is extended or adjusted under 35 U.S.C. 154(b) by 994 days.

(21) Appl. No.: 12/227,444

(22) PCT Filed: May 15, 2006

(86) PCT No.: PCT/EP2006/004560
§ 371 (c)(1),
(2), (4) Date: Jun. 22, 2009

(87) PCT Pub. No.: WO2007/131526
PCT Pub. Date: Nov. 22, 2007

(65) Prior Publication Data
US 2009/0300672 A1 Dec. 3, 2009

(51) Int. Cl.
*H04N 7/10* (2006.01)
*H04N 7/025* (2006.01)
(Continued)

(52) U.S. Cl.
CPC ...... *H04N 7/17318* (2013.01); *H04L 29/06027* (2013.01); *H04N 21/4524* (2013.01); *H04N 21/4532* (2013.01); *H04N 21/454* (2013.01); *H04N 21/47805* (2013.01); *H04N 21/47815* (2013.01); *H04N 21/632* (2013.01);
(Continued)

(58) Field of Classification Search
USPC .............................................. 725/14, 22, 34
See application file for complete search history.

(56) References Cited

U.S. PATENT DOCUMENTS 6,698,020 B1 * 2/2004 Zigmond et al. ................ 725/34
8,108,895 B2 * 1/2012 Anderson et al. ............... 725/36
(Continued)

FOREIGN PATENT DOCUMENTS

| EP | 1 079 623 A1 | 2/2001 |
| EP | 1 524 611 A2 | 2/2005 |
| WO | WO-02/067086 A2 | 8/2002 |
| WO | WO-2004/098173 A1 | 11/2004 |
| WO | WO-2005/112334 A2 | 11/2005 |

OTHER PUBLICATIONS

Pouwelse et al., "P2P-based PVR Recommendation using Friends, Taste Buddies and Superpeers", (online), pp. 1-6, XP002410256 Retrieved from the Internet: URL:http://isa.its.tudelft.nl/{pouwelse/P2P_based_PVR_recommendation.pdf>.

*Primary Examiner* — Robert Hance
(74) *Attorney, Agent, or Firm* — Siritzky Law, PLLC

(57) ABSTRACT

There is provided a method of associating program content data in a peer-to-peer digital television network. The network comprises a program content source, a network comprising a plurality of network nodes operable to receive data blocks corresponding to program content propagated from the program content source, and at least one user node coupled to the network. The method includes steps of: (a) receiving one or more user profiles of the at least one user node; (b) matching the one or more user profiles with the program content for determining preferential program content for presentation to the at least one user; (c) including identifiers of the preferential program content in the one or more program content lists for receipt at the at least one user node; (d) procuring for the at least one user node the preferential program content using the identifiers from the plurality of network nodes; and (e) selectively presenting at least part of the preferential program content to the at least one user node.

29 Claims, 6 Drawing Sheets

(51) Int. Cl.
*H04N 7/173* (2011.01)
*H04L 29/06* (2006.01)
*H04N 21/45* (2011.01)
*H04N 21/454* (2011.01)
*H04N 21/478* (2011.01)
*H04N 21/63* (2011.01)
*H04N 21/81* (2011.01)
*H04L 29/08* (2006.01)

(52) U.S. Cl.
CPC ............ *H04N21/812* (2013.01); *H04L 65/605* (2013.01); *H04L 65/4076* (2013.01); *H04L 67/104* (2013.01); *H04L 67/1091* (2013.01); *H04L 67/306* (2013.01); *H04L 67/108* (2013.01); *H04L 67/1093* (2013.01)
USPC .................. 725/34; 725/14; 725/22; 725/32; 725/35

(56) References Cited

U.S. PATENT DOCUMENTS

| | | | |
|---|---|---|---|
| 2002/0059094 A1* | 5/2002 | Hosea et al. | 705/10 |
| 2002/0147628 A1* | 10/2002 | Specter et al. | 705/10 |
| 2003/0135553 A1 | 7/2003 | Pendakur | |
| 2003/0188308 A1* | 10/2003 | Kizuka | 725/32 |
| 2004/0025180 A1* | 2/2004 | Begeja et al. | 725/46 |
| 2004/0054661 A1* | 3/2004 | Cheung et al. | 707/3 |
| 2004/0064833 A1* | 4/2004 | Lee et al. | 725/42 |
| 2005/0060745 A1* | 3/2005 | Riedl et al. | 725/42 |
| 2005/0268102 A1* | 12/2005 | Downey | 713/176 |
| 2006/0085816 A1* | 4/2006 | Funk et al. | 725/34 |
| 2006/0287915 A1* | 12/2006 | Boulet et al. | 705/14 |
| 2007/0113240 A1* | 5/2007 | McLean et al. | 725/8 |
| 2007/0204310 A1* | 8/2007 | Hua et al. | 725/88 |

* cited by examiner

METHOD OF ASSOCIATING PROGRAM CONTENT DATA IN A DIGITAL TELEVISION NETWORK

FIELD OF THE INVENTION

The present invention relates to methods of associating program content data in digital television networks for controlling program content data flow within the networks. Moreover, the present invention also concerns digital television networks operable to execute such methods of associating program content. Furthermore, the present invention relates to software products executable on computing hardware for implementing said methods of associating program content data.

BACKGROUND TO THE INVENTION

Television broadcasting systems are well known for providing program content to users. Broadcasting organizations are responsible for generating the program content. Two financial models substantially pertain to operation of the broadcasting organizations. In a first financial model, users pay the broadcasting organizations for a right to receive and consume the program content; such payment is conveniently made by way of subscription or "Pay-to-View". In a second financial model, advertisers pay the broadcasting organizations to include advertisements in the program content which pays for the cost of preparing and transmitting the program content to users.

Conventional television broadcasting systems are operable to transmit specific program content pursuant to program time schedules. Such program schedules are inconvenient because users are obliged to consume the program content at its time of transmission. In order to address such inconvenience, users have for many years employed video recorders to record program content to enable subsequent watching of program content at a later time than that of its transmission to the users. Such video recorders enable users to employ fast-forward or fast-reverse functions of the recorders to skip over advertisements which are not of user interest. Such a manner of behavior is of concern to advertisers paying for their advertisements to be included in the program content broadcast pursuant to the aforesaid second financial model.

Recently, more sophisticated types of video recorder have been developed. In a U.S. patent application no. US 2005/0132418 (TIVO), there is described a multimedia time warping system indicated generally by 10 in FIG. 1. The system 10 allows a user thereof to store selected television broadcast programs while the user is simultaneously watching or reviewing another program. Conveniently, the system 10 is similar in size to a conventional video recorder. The system 10 accepts television input streams 20 in a multitude of forms to an input module 30 which converts the input streams 20 to an MPEG encoded formatted stream 40 for internal transfer via a media switch 50 within the system 10. Events are recorded in the system 10 that indicate the type of program component that has been found, where it is located in a data storage device 90 of the system 10, and when it was transmitted. Program logic 70, for example a computer processing unit (CPU), of the system 10 is notified that an event has occurred and that corresponding data can be selectively extracted from data buffers 80 of the system 10 for selective storage on the data storage device 90 of the system 10. The system 10 further includes a decoder 100 for converting encoded streams stored within the system 10 to a television output signal 110 for user presentation on a contemporary television display 120. The system 10 provides user control commands which enable the user to view stored programs with at least the following functions: reverse, fast forward, play, pause, index, fast/slow reverse play, and fast/slow play. Such facilities enable the user to effectively avoid having to view advertisements.

As a further advance to the system 10, it is proposed that the program logic 70 is provided with software for performing automatic editing of advertisements, for example by identifying characteristic fingerprints of program content in comparison to characteristic fingerprints of advertisements and then performing an editing function to automatically remove those portions of received signals corresponding to advertisements. Alternatively, such editing can also be potentially performed manually by the user. Such technical developments are of concern to broadcasters and advertisers on account of potentially eroding advertising revenue and advertisement effectiveness.

Recently, advertising organizations which have hitherto employed television advertising are progressively switching to other media in which to advertise, for example in newspapers, via the Internet and by telephone sales. In consequence, television broadcasting organizations operating pursuant to the aforesaid second financial model are experiencing shortfalls of revenue.

Thus, the technical problem at least partially addressed by the present invention is to adapt television broadcasting networks so that users are again obliged to view advertising material in a manner which provides benefits to organizations paying for their advertisements to be distributed to television users.

SUMMARY OF THE INVENTION

An object of the present invention is to provide a digital television network which is more effectively capable of presenting advertisement program content to one or more users coupled to the network.

According to a first aspect of the invention, there is provided a method of associating program content data in a digital television network, the network comprising a program content source, a network comprising at least one network node operable to receive data blocks corresponding to program content propagated from the program content source, and at least one user node coupled to the network, wherein the at least one user node is operable to receive program content information indicative of at least a sub-set of the data blocks propagated to the at least one network node, and the at least one user node is operable to receive program content corresponding to the sub-set of the data blocks from the at least one network node for presenting program content to one or more users of the at least one user node, the method comprising steps of:

(a) receiving or determining one or more user profiles of the at least one user node;
(b) matching the one or more user profiles with the program content for determining preferential program content for presentation to the at least one user;
(c) including identifiers of the preferential program content in the program content information;
(d) procuring for the at least one user node the preferential program content using the identifiers from the at least one network node; and
(e) selectively presenting at least part of the preferential program content to the at least one user node.

The invention is of advantage in that preferential program content, for example advertisement program content and/or film program content, is capable of being more effectively and selectively presented to the one or more users.

In construing the present invention, "preferential program content" refers to program content deemed preferential to the network and the user taken as a whole.

Preferably, in the method, the data blocks are propagated in a peer-to-peer manner within the network to the at least one network node, for example plurality of network nodes. Such peer-to-peer propagation of the data blocks is susceptible to reducing data supply demand to the program content source, therefore enabling the one or more users to be provided with customized program content in response to their user profile Z.

Preferably, in the method, the data blocks propagated within the at least one network node are encrypted with mutually different encryption keys to one or more encryption keys employed to encrypt the program content information (Q) for communication to the at least one user node. Such use of encryption keys is potentially capable of rendering the network more difficult to eavesdrop or damage in a hostile manner by third parties, for example hackers.

Preferably, in the method, the at least one network node includes supernodes, each supernode being coupled in communication with its one or more associated data storage nodes, wherein step (d) includes steps of:

(f) communicating the identifiers from the at least one user node to the supernodes for determining which of the supernodes in conjunction with its one or more data storage nodes are capable of providing program content corresponding to the identifiers to the at least one user node;

(g) communicating one or more indications of which of the supernodes whose associated one or more data storage nodes are capable of providing the program content corresponding to the identifiers to the at least one user node;

(h) communicating one or more requests from the at least one user node to the supernodes whose one or more data storage nodes are capable of providing the program content to the at least one user node; and (i) supplying from the supernodes and/or their one or more data storage nodes capable of providing the program content to the at least one user node, the program content corresponding to the one or more requests to the at least one user node.

Preferably, in the method, the network is implemented using the Internet. Such implementation is of benefit in view of widespread implementation of the Internet throughout many regions of the world.

Preferably, in the method, the program content propagated from the program content source to the at least one network node includes advertisement program content and/or film program content, the method comprising further steps of:

(j) collating information indicative of delivery of the advertisement program content and/or the film program content via the at least one network node to the at least one user node; and (k) reporting the information to one or more providers of the advertisement program content and/or the film program content.

Such collation of the information is capable of providing advertisers and/or film producers with a substantially real-time feedback of a manner in which their advertising campaigns and/or film presentation campaigns are being implemented.

Preferably, in the method, the program content propagated from the program content source to the at least one network node includes advertisement program content and/or film program content, the method comprising further steps of:

(l) collating information indicative of delivery of the advertisement program content and/or the film program content via the at least one network node to the at least one user node, the information including user response to being presented with the advertisement program content and/or the film program content; and (m) reporting the information to one or more providers of the advertisement program content and/or the film program content.

Such collation of the information is capable of providing advertisers and/or film producers with substantially real-time feedback of effectiveness that their advertising campaigns and/or film presentation campaigns, and even potentially an indication of effectiveness of the advertising campaigns in relation to presentation of film program content.

Preferably, in the method, the matching in step (b) includes a step of:

(n) processing metadata information corresponding to at least one of the one or more user profiles and the program content to identify a degree of similarity therebetween.

Such matching is preferably executed substantially at the program content source. Alternatively, the matching can, at least in part, be executed within the plurality of nodes and/or the user node to decrease computation load at the program content source.

Preferably, in the method, the step (n) of processing metadata information includes steps of:

(o) computing probabilities of association between terms included in the metadata information; and (p) applying a processing function to the probabilities of association to compute a degree of matching for step (b).

Use of metadata when implementing the method is of benefit in that it provides a concise indication of subject matter and is for already established program content readily available.

Preferably, the method includes a step of:

(q) computing the probabilities from the terms in the metadata information subject to translation and/or filtering and/or spelling correction to remove terms bearing relatively insignificant information and/or to correct incorrectly spelt terms.

Such translation and/or filtering is susceptible to enabling matches to being computed between metadata in different languages, and well as improving an accuracy of match obtained by removing commonly-occurring words which could give rise to a spurious indication of match.

Preferably, the method includes a step of:

(r) updating the probabilities of association between terms included in the metadata information in response to user response to being presented, or offered to be presented, with the preferential program content in step (e).

Such updating is a potentially powerful tool to enable the network to perform considerably better to provide enhanced user program content searching satisfaction in comparison similar types of systems which do not implement such updating.

Preferably, in the method, the step (n) of processing metadata information includes steps of:

(s) computing probabilities of association between terms included in the metadata information for computing a degree of matching; and (t) repeating computation in step (s) using substantially equivalent terms to the terms included in the metadata to compute a degree of sensitivity of the degree of matching in respect of the terms included in the metadata; and (u) applying a processing function to the probabilities of association and to the degree of sensitivity to compute a degree of matching for step (b).

Testing sensitivity of matching is of benefit in that targeting of advertisements can be enhanced and more representative electronic program guides (EPGs) can be provided to the one or more users. More preferably, in the method, the equivalent terms are derived from an electronic Thesaurus, a spelling corrector or similar database.

Preferably, the method includes a further step of:

(v) reporting the information to one or more providers of the advertisement program content to the program content source as at least one of: substantially real-time report of an advertising campaign associated with the advertisement program content, film program content with which the advertisement program content is advantageously co-presented with for achieving enhanced user attention.

Preferably, in step (a) of the method, the one or more user profiles of the at least one user node are communicated to the program content source, and the step (b) is executed substantially at the program content source. However, other implementations of the method are feasible wherein step (b) can be implemented at least in part at the plurality of network nodes.

Preferably, in the method, the one or more user profiles are prepared at the one or more user nodes using application software operable to generate the one or more user profiles using metadata terms selected from a defined set of metadata terms. By standardizing metadata terms used in compiling the user profiles Z, better targeting of program content, for example advertisements, to the one or more users is possible.

According to a second aspect of the invention, there is provided a method of associating program content data in a peer-to-peer digital television network, the network comprising a program content source, a peer-to-peer network comprising at least one network node operable to receive data blocks corresponding to program content propagated from the program content source, and at least one user node coupled to the network, the method comprising steps of:

(a) receiving one or more user profiles of the at least one user node;

(b) matching the one or more user profiles with the program content for determining preferential program content for presentation to the at least one user;

(c) including identifiers of the preferential program content in program content information (Q);

(d) procuring for the at least one user node the preferential program content using the identifiers from the at least one network node; and (e) selectively presenting at least part of the preferential program content to the at least one user node.

Preferably, in the method, the at least one network node includes supernodes, each supernode being coupled in communication with its one or more associated data storage nodes, wherein step (d) includes steps of:

(f) communicating the identifiers from the at least one user node to the supernodes for determining which of the supernodes in conjunction with its one or more data storage nodes are capable of providing program content corresponding to the identifiers to the at least one user node;

(g) communicating one or more indications of which of the supernodes whose associated one or more data storage nodes are capable of providing the program content corresponding to the identifiers to the at least one user node;

(h) communicating one or more requests from the at least one user node to the supernodes whose one or more data storage nodes are capable of providing the program content to the at least one user node; and (i) supplying from the supernodes, and/or their one or more data storage nodes capable of providing the program content to the at least one user node, the program content corresponding to the one or more requests to the at least one user node.

According to a third aspect of the present invention, there is provided a digital television network operable to supply program content to one or more users, the network comprising a program content source, a network comprising at least one network node operable to receive data blocks corresponding to program content propagated from the program content source, and at least one user node coupled to the network, wherein the at least one user node is operable to receive program content information indicative of at least a sub-set of the data blocks propagated to the at least one network node, and the at least one user node is operable to receive program content corresponding to the sub-set of the data blocks from the at least one network node for presenting program content to the one or more users of the at least one user node, wherein the network is operable:

(a) to receive or determine one or more user profiles of the at least one user node;

(b) to match the one or more user profiles with the program content for determining preferential program content for presentation to the at least one user;

(c) to include identifiers of the preferential program content in the program content information (Q) for receipt at the at least one user node;

(d) to procure for the at least one user node the preferential program content using the identifiers from the at least one network node; and (e) to selectively present at least part of the preferential program content to the at least one user node.

Preferably, in the digital television network, the data blocks are propagated in a peer-to-peer manner within the network to the at least one network node.

Preferably, in the digital television network, the network is implemented using the Internet.

Preferably, in the digital television network, the data blocks propagated within the at least one network node are encrypted with mutually different encryption keys to one or more encryption keys employed to encrypt the program content information (Q) for communication to the at least one user node.

Preferably, in the digital television network, the at least one network node includes supernodes, each supernode being coupled in communication with its one or more associated data storage nodes, wherein:

(f) the at least one user node is operable to communicate the identifiers to the supernodes (540) for determining which of the supernodes (540) in conjunction with their one or more data storage nodes (550) are capable of providing program content corresponding to the identifiers to the at least one user node (600);

(g) the supernodes (540) whose associated one or more data storage nodes (550) are capable of providing the program content corresponding to the identifiers to the at least one user node (600) are operable to communicate one or more indications thereof to the at least one user node (600);

(h) the at least one user node (600) is operable to communicate one or more requests to the supernodes (540) whose one or more data storage nodes (550) are capable of providing the program content to the at least one user node (600); and (i) the supernodes (540) and/or their one or more data storage nodes capable of providing the program content to the at least one user node (600), are operable to supply the program content corresponding to the one or more requests to the at least one user node (600).

Preferably, in the digital television network, the program content propagated from the program content source to the at least one network node includes advertisement program content and/or film program content, the network being operable:

(j) to collate information indicative of delivery of the advertisement program content and/or the film program content via the at least one network node to the at least one user node; and (k) to report the information to one or more providers of the advertisement program content and/or the film program content.

Preferably, in the digital television network, the program content propagated from the program content source to the at least one network node includes advertisement program content and/or film program content, the network being operable:

(l) to collate information indicative of delivery of the advertisement program content and/or the film program content via the at least one network node to the at least one user node, the information including user response to being presented with the advertisement program content and/or the film program content; and (m) to report the information to one or more providers of the advertisement program content and/or the film program content.

Preferably, in the digital television network, the matching of the one or more user profiles with the program content for determining preferential program content for presentation to the at least one user involves processing metadata information corresponding to at least one of the one or more user profiles and the program content to identify a degree of similarity therebetween.

Preferably, in the digital television network, processing metadata information involves:

(n) computing probabilities of association between terms included in the metadata information; and (o) applying a processing function to the probabilities of association to compute a degree of matching.

More preferably, the digital television network is operable to compute the probabilities from the terms in the metadata information subject to translation and/or filtering and/or spelling check to remove terms bearing relatively insignificant information or correct incorrectly spelt terms.

Preferably, the digital television network is operable to update the probabilities of association between terms included in the metadata information in response to user response to being presented, or offered to be presented, with the preferential program content.

More preferably, the network is operable to process metadata information by:

(p) computing probabilities of association between terms included in the metadata information for determining a degree of matching; and (q) repeating computations in step (p) using substantially equivalent terms to the terms included in the metadata to compute a degree of sensitivity of the degree of matching in respect of the terms included in the metadata;

(r) applying a processing function to the probabilities of association and to the degree of sensitivity to compute a degree of matching for step (b).

More preferably, in the network, the equivalent terms are derived from an electronic Thesaurus, a spell checker or similar database.

Preferably, the network is operable to report the information to one or more providers of the advertisement program content to the program content source as at least one of: substantially real-time report of an advertising campaign associated with the advertisement program content, film program content with which the advertisement program content is advantageously co-presented with for achieving enhanced user attention.

Preferably, the network is operable to communicate the one or more user profiles of the at least one user node to the program content source, and the program content source is operable to match the one or more user profiles with the program content for determining preferential program content for presentation to the at least one user.

More preferably, in the digital television network, the one more user profiles are prepared at the one or more user nodes using application software operable to generate the one or more user profiles using metadata terms selected from a defined set of metadata terms.

According to a fourth aspect of the present invention, there is provided a software product executable on computing hardware included within the digital television network according to the second aspect of the invention, the software product being executable on the computing hardware for implementing the method according to the first aspect of the invention.

According to a fifth aspect of the present invention, there is provided a peer-to-peer digital television network operable to supply program content to one or more users, the network comprising a program content source, a network comprising at least one network node operable to receive data blocks corresponding to program content propagated from the program content source, and at least one user node coupled to the network, wherein the network is operable:

(a) to receive or determine one or more user profiles of the at least one user node;

(b) to match the one or more user profiles with the program content for determining preferential program content for presentation to the at least one user;

(c) to include identifiers of the preferential program content in program content information (Q);

(d) to procure for the at least one user node the preferential program content using the identifiers from the at least one network node; and (e) to selectively present at least part of the preferential program content to the at least one user node.

Preferably, in the peer-to-peer digital television network, the at least one network node include supernodes, each supernode being coupled in communication with its one or more associated data storage nodes, wherein:

(f) the at least one user node is operable to communicate the identifiers to the supernodes for determining which of the supernodes in conjunction with their one or more data storage nodes are capable of providing program content corresponding to the identifiers to the at least one user node;

(g) the supernodes whose associated one or more data storage nodes are capable of providing the program content corresponding to the identifiers to the at least one user node are operable to communicate one or more indications thereof to the at least one user node;

(h) the at least one user node is operable to communicate one or more requests to the supernodes whose one or more data storage nodes are capable of providing the program content to the at least one user node; and (i) the supernodes and/or their one or more data storage nodes capable of providing the program content to the at least one user node, are operable to supply the program content corresponding to the one or more requests to the at least one user node.

It will be appreciated that features of the invention are susceptible to being combined in any combination without departing from the scope of the invention as defined by the accompany claims.

DESCRIPTION OF THE DIAGRAMS

Embodiments of the present invention will now be described, by way of example only, with reference to the accompanying drawings wherein.

Figure 1:
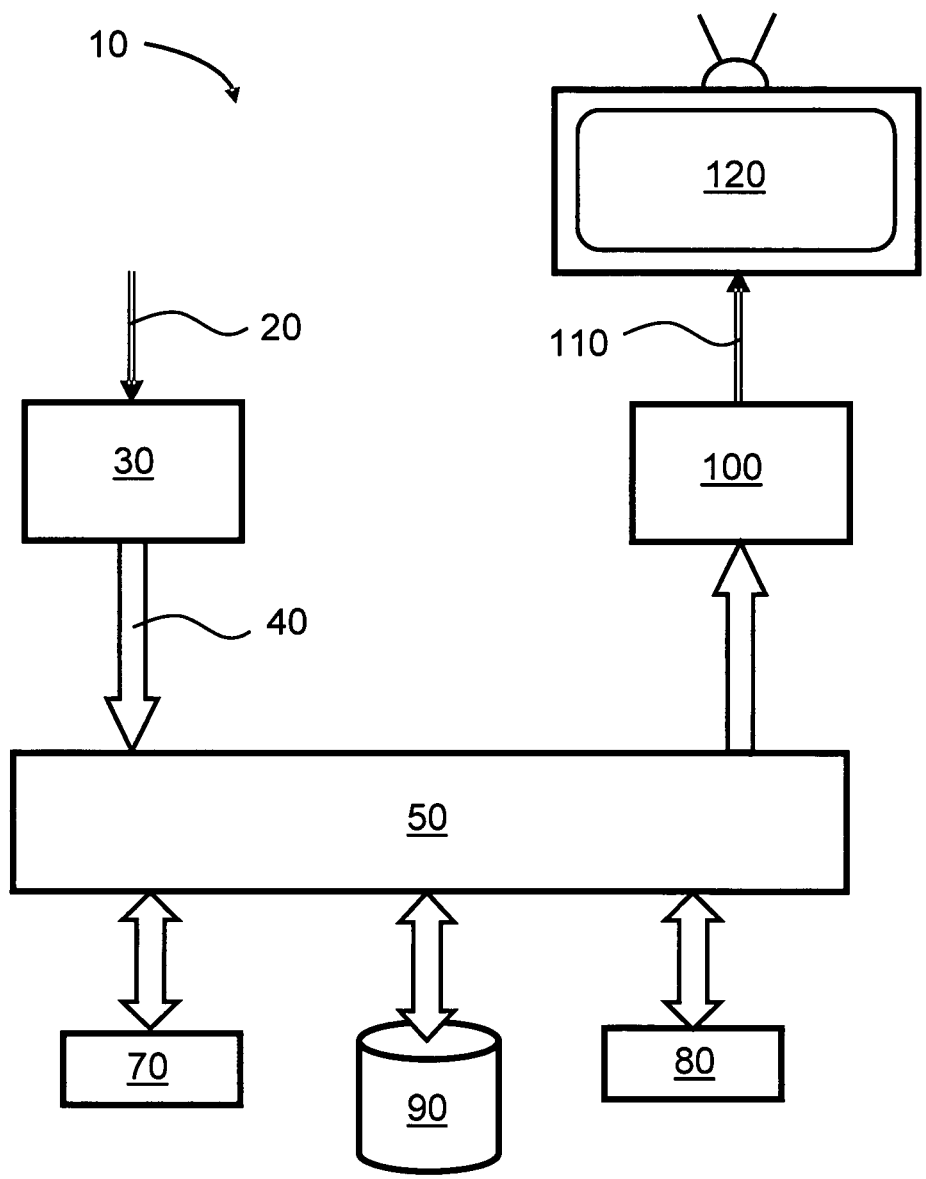
FIG. 1 is a schematic illustration of a known multimedia time warping system as described in a United States patent application no. US 2005/0132418 (TIVO)

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, the present invention is concerned with methods of associating program content in digital television networks, for example with methods of associating advertisement program content $P_A$ with user profiles Z expressed as user metadata UMD and/or film program content $P_F$. Such digital television networks are operable to supply data, for example, via the Internet, although additionally or alternatively other types of network operable to communicate data can be employed. When implementing the present invention, the Internet or similar is utilized in a peer-to-peer manner to provide program content P to a user U without causing overload at a principal server S, conveniently referred as being a "back end" server, at which the program content P originates. The program content P is propagated in discrete data blocks B from the principal server S to several nodes N in the Internet for storage thereat. The several nodes N are beneficially configured as supernodes coupled in communication with associated data storage nodes wherein each supernode maintains a record of data blocks stored in its associated data storage nodes. Each data block B is at least partially in encrypted form and accompanied by an identifier I uniquely identifying the block B. The user U desirous to receive program content P interrogates the principal server S to identify program content P which is available on the Internet, namely corresponding to the discrete data blocks B which have been propagated within the Internet; the principal server S provides the user U with a list of available program content P and the user U responds by sending a request R to the principal server S for specific program content $P_S$ desired by the user U. The principal server S then responds to the request R from the user U by sending a cue list Q corresponding to the specific program content $P_S$ to the user U; the cue list Q includes identifiers $I_S$ of the discrete data blocks $B_S$ constituting the specific program content $P_S$. Moreover, the cue list Q is beneficially customized in response to characteristics of the user profile Z. The user U executes the cue list Q by sending block requests $R_B$ for the discrete data blocks $B_S$ constituting the specific program content $P_S$ into the Internet to the several nodes N which have received the discrete data blocks B propagated earlier from the principal server S; requests are received at the aforesaid supernodes included in the nodes N. On receiving via the Internet the block requests $R_B$ from the user U, the supernodes of the several nodes N are then operable to search their local data storage and their associated data storage nodes to determine whether or not one or more data blocks B stored thereat correspond to the data block requests $R_B$ received at the several nodes N. If a match is found between the data block requests $R_B$ and data blocks B stored at the several nodes N, one or more of the nodes N are operable to send one or more requested data blocks $B_R$ to the user U for decryption and then consumption thereat. Such a method of providing program content P is of benefit in that the principal server S can deliver data blocks B into the several nodes N of the Internet asynchronously to activities at the user U, thereby avoiding data supply overload problems at the principal server S. Moreover, interaction between the user U and the principal server S involves relatively little data exchange, namely substantially a list of available program content P, the cue list Q and the user profile Z. Additionally, no program content is sent directly, except in exceptional circumstances, from the principal server S via the Internet to the user U; as such, this fundamentally differentiates the present invention from contemporary streamed program content approaches to deliver television services.

Thus, such an approach to program content supply via the Internet in a peer-to-peer manner as described in overview above at least partially addresses problems encountered in aforementioned known approaches to streaming data when providing television services, especially user-customized television services. By addressing bandwidth issues which represent a major limitation in contemporary streamed digital television systems, it becomes possible to deliver program content which is adapted to individual users in a customized manner. In particular, it is feasible to at least partially customize advertisement program content $P_A$ to tastes and characteristics of individual users U, for example to user profiles Z and/or to film program content $P_F$ which the users U select to view. In customizing such advertisement program content $P_A$, there is a requirement in the network to associate metadata associated with advertisement program content $P_A$ to one or more of: metadata of film program content $P_F$, user profiles Z as defined by user profile metadata UMD. A method of associating metadata representative of program content suitable for employing when operating the network will be described in more detail later. However, it will be appreciated that alternative approaches to associating metadata presently employed in, for example, Internet search engines are capable of being adapted to be used in the network for metadata matching purposes.

In the cue list Q, the principal server S can include advertisement program content $P_A$ corresponding to advertisement subject matter which has also been delivered from the principal server S for propagation within the Internet. Thus, the principal server S can specify in the cue list Q a preferred type of advertisement to be presented to the user U, for example in response to a user profile Z being supplied from the user U to the principal server S. Beneficially, the user profile Z is anonymous so that the principal server S is unaware of the real name and address A of the user U. In such a manner, advertisers' advertisement material can be customized to the user U to provide purchase propositions which are more likely to interest the user U in contradistinction to untargeted advertising as used in conventional television broadcasts via UHF or satellite links.

Figure 2:
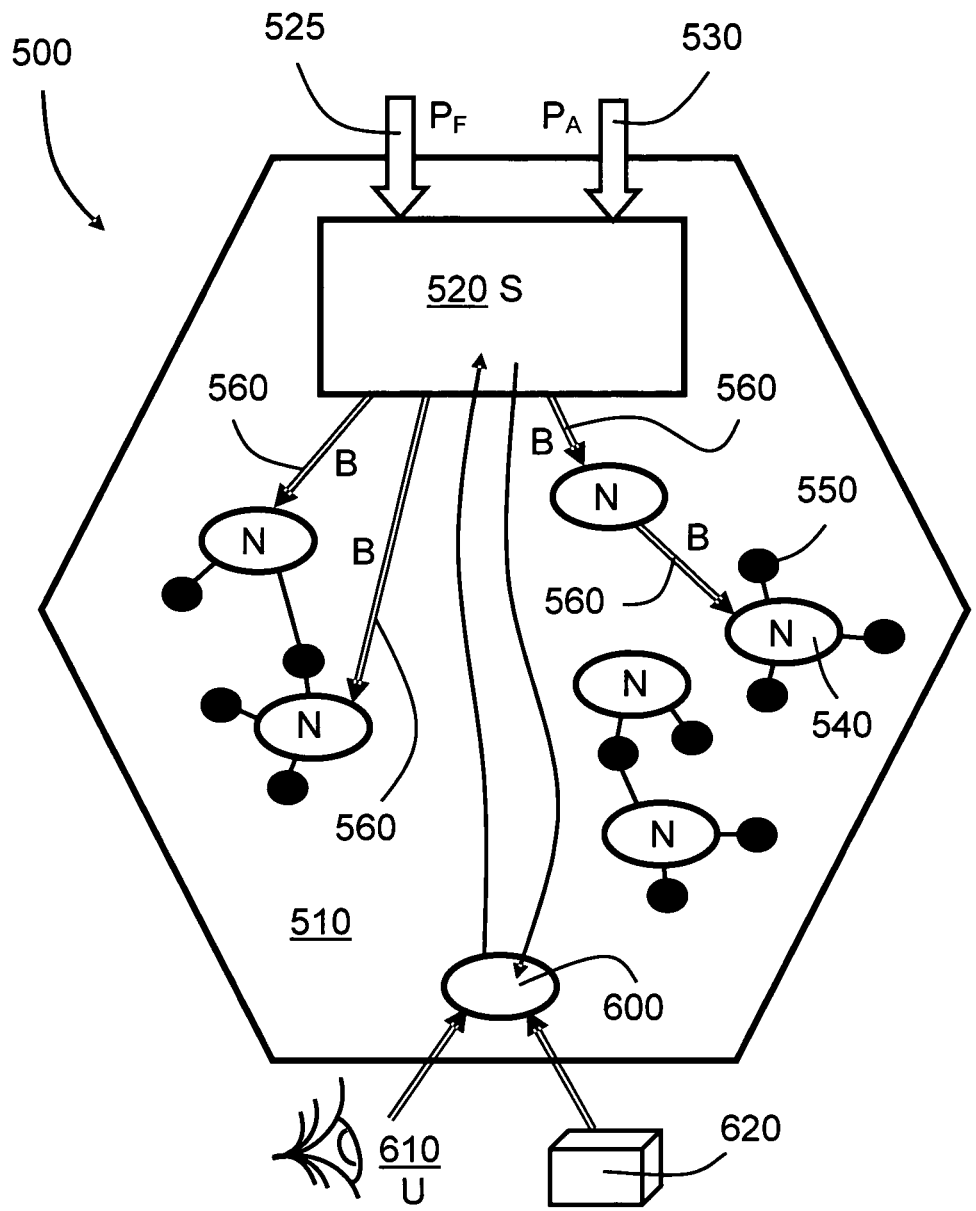
FIG. 2 is an illustration of a digital television network pursuant to the present invention.

The present invention will now be described in more detail. Referring next to FIG. 2, an embodiment of the invention is illustrated as a digital television network indicated generally by 500. The digital television network 500 is also susceptible to being regarded as a digital television system. The network 500 comprises the Internet or similar type of network denoted by 510 including the principal server S denoted by 520. The principal server S 520 is coupled to receive film program content $P_F$ denoted by 525 from organizations such as film producers, from national television companies, from independent film producers, and from film archives and similar. The film program content $P_F$ therefore includes, for example, movies, films, documentaries, sports coverage, news reports, cartoons and similar. Moreover, the principal server S 520 is also coupled to receive advertising program content $P_A$ denoted by 530 from advertising organizations, from specialist interest groups such as religious organizations and similar. The program content $P_A$ thus comprises advertisements and promotional subject matter.

As described earlier, the principal server S 520 is operable to deliver program content P in the form of encrypted data blocks B via communication links 560 provided in the Internet 510. An example method employed within the network 500 to encrypt the data blocks B will be elucidated in more detail later.

In FIG. 2, the user U is denoted by a user node 600. The user node 600 is susceptible to being implemented as a personal computer (PC) loaded with suitable compatible software, a screen of the personal computer being operable to present television images to the user U denoted by 610. Alternatively, the user node 600 is susceptible to being implemented as a local server coupled via a set-top box to a conventional television. Such a conventional television can comprise one or more of: a cathode ray tube (CRT) television, a flat-screen liquid crystal display (LCD) television, a flat-screen plasma display television, a liquid crystal display (LCD), a projection television, and an organic light emitting diode (OLED) display television. On account of data blocks $B_R$ requested by the user U 610 potentially being received at the user node 600 in any order from the nodes N 540 and at imprecisely defined times as a result of peer-to-peer operation of the network 500, the user node 600 includes at least one data storage buffer therein, for example a hard disc drive (HDD), an optical data storage drive and/or solid state memory for storing such received data blocks $B_R$.

The user U 610 is optionally capable of loading user program content 620 into his/her user node 600 and sending such content to the principal server S 520, known also as the "back end server". Such user program content 620 will be elucidated in more detail later and includes user profile Z information expressed in user metadata UMD.

Operation of the digital television network 500 will now be described in greater detail with reference to FIG. 2. Operators of the principal server S 520 comprise persons generally responsible for administering the network 500; the persons responsible for the network 500 do not have control of the user U 610 who remains essentially anonymous to these persons. These persons interface with program content providers regarding licensing and procurement of the film program content $P_F$ 525 from various suppliers, for example film producing companies, film licensing companies, film archives, television broadcast corporations and similar. Such licensing and procurement beneficially is in full compliance with international copyright provisions, for example with provisions of the Berne Convention. The persons administering the network 500 also interface with advertising organizations for procuring the advertising program content $P_A$ 530. These advertising organizations pay, for example, the persons responsible for the digital television network 500 to target the advertisement program content $P_A$ 530 dependent upon one or more of the following constraints:

(a) towards users U having particular user profiles Z, namely to present subject matter of interest to the users U, for example golf equipment to golfing enthusiasts;

(b) to be presented to users U in conjunction with certain selected types of program content $P_F$ 525 being presented shortly after or shortly before the advertisement program content $P_A$, namely to present the advertisement program content $P_A$ 530 in a suitable setting, for example to advertise kitchen equipment in conjunction with a television program on cooking and wine;

(c) to be presented to users U based upon geographical constraints, for example a geographical region or neighborhood in which the users U live based upon their user profiles Z, for example to advertise a local restaurant located in a 2 km radius of where the users U live;

(d) to be presented to users U based upon physical conditions, for example weather conditions such as temperature and/or incident sunshine, time of day, day of week, certain events having occurred such as Holland winning the World Football Cup and so forth; for example, an ice cream advert is presented on condition that the ambient weather temperature in a region where the user U lives exceeds 25° C. and there is sunshine in the user's U region; and (e) not to be presented to users U in conjunction with certain selected types of program content $P_F$ 525 being presented shortly after or shortly before the advertisement program content $P_A$, namely circumventing presentation of the advertisement program content $P_A$ in unsuitable association; for example, presentation of an advert for diapers (nappies) is avoided immediately before and/or after a fine food program.

Other constraints are possible based on user U age, religious group, ethnic group, health, income group, marital status and so forth.

The network 500 is operable such that the principal server S 520 propagates application software AS throughout the Internet 510 in response to user U request, for example by way of Internet registration to the system 500 by such users U sending their user profiles Z to the principal server 520 and/or paying a fee to receive credit tokens T. Alternatively, registration to the network 500 can be optionally free to users U. Beneficially, the principal server S 520 is supported by a function such as contemporary secure Pay-Pal or similar payment system operable to support secure payment via the Internet 510. On receipt of such application software AS at the user node 600, the user U 610 is capable of receiving program content from the Internet 510 propagated from the principal server S 520.

As elucidated in the foregoing, the network 500 is operable to cause propagation of the film program content $P_F$ and the advertisement program content $P_A$ from the principal server S 520 throughout the Internet 510 to one or more of the nodes N 540 whereat the program contents $P_F$, $P_A$ are stored as the aforesaid encrypted data blocks B. Such propagation is performed in a peer-to-peer manner wherein the principal server S 520 optionally is not able to control an extent and manner of propagation of the data blocks B 700 within the network 500. Moreover, such peer-to-peer propagation is in clear contradistinction to conventional television systems operable to utilize data streaming substantially from central servers to users. Each data block B 700 as denoted by 700 in FIG. 3 beneficially comprises several components parts including when decrypted:

(a) program content 710, for example implemented as encrypted MPEG-encoded data including audio data;

(b) metadata 720 describing the program content 710, for example name of actor, name of film director, year of release, category of film such as comedy or documentary;

(c) an identifier I 730 uniquely identifying its corresponding block B 700; and (d) some executable software code 740, for example implemented in Java software language, for defining conditions of use of the program content 710 within the network 500.

Optionally, the data blocks B 700 comprise a plurality of smaller data bundles whose structure in respect of the aforesaid several component parts are not immediately understandable to third parties eavesdropping on the network 510. The executable software 740 serves to define, for example, use of the advertisement program content $P_A$ relating to advertisements such as them being shown in conjunction with only certain types of films and not in conjunction with other types of advertisements in a given geographical region when the outdoor ambient temperature in that region is greater than 15° C.

Beneficially, data blocks B 700 which are only relevant to a particular geographical region, for example advertisement program content $P_A$ conveying information regarding a particular restaurant or theater in Tokyo in Japanese language, are propagated only to those nodes N 540 serving that particular geographical region rather than generally unnecessarily occupying data storage space within the network 500 in regions where Japanese as a language is generally not known and understood.

Initially, when the user U 610 is desirous to subscribe to the network 500, the user U 610 contacts the principal server S 520, for example a sub-server thereof configured to deal with new enrolments, via a Universal Resource Locator (URL); the user U 610 then proceeds to provide a user profile Z, although the user U 610 refrains from providing any personal details such as real name or residential address so that the user U 610 remains, in reality, anonymous to the network 500; such anonymity is important in the network 500 to respect personal privacy of the user U 610. As an example, the actual user 610 is a middle-aged female living in Scotland parading in her user profile Z supplied to the principal server S 520 as a teenage male allegedly living in London. The user profile Z is preferably provided by the user U 610 selecting various options from a menu list presented to the user U 610; there is thereby automatically generated user metadata UMD, namely the aforesaid user profile Z expressed in metadata terms, in a standardized format corresponding to the user U 610. Such standardized form for the user metadata UMD is susceptible to rendering the aforesaid program content $P_A, P_F$ more efficiently matched to the user metadata UMD.

On providing the user profile metadata UMD, the principal server S 520 is operable to cause the application software AS to be downloaded from the principal server S 520 or another server of the network 500 tasked with providing the user U 610 with software; for example, one or more of the nodes N 540, for example supernodes or data storage nodes associated therewith, are able to provide the user U 610 with a download of the application software AS. Optionally, the user U 610 can purchase tokens T from the principal server S 520 or another server of the network 500 when downloading the application software AS; alternatively, the user U 610 can periodically buy such tokens T via the user node 600 once the application software AS has been loaded into the user node 600 and is executing on computing hardware therein, for example on a personal computer (PC). The user U 610 is also provided with at least one public password WP, namely $K_{Pub}$, complementary to a corresponding private password employed by the principal server S 520 in encrypting the data blocks B 700. By such an arrangement, the user U 610 only has potential access to the data blocks B 700, under supervision of a cue list Q provided from the principal server S 520, once the user U 610 has registered with the principal server S 520.

On executing the application software AS, the user node 600 is optionally initially provided with advertisement program content $P_A$ which the application software AS is programmed to seek locally in the network 500 to the user node 600. Such seeking occurs by the user node 600 sending requests for free advertisement program content $P_A$ stored substantially locally thereto.

The user U 610 as a next step sends a request enquiry EN to the principal server S 520 for a list of film program content $P_F$ available within the network 500. The principal server S 520 responds by sending an electronic program guide EPG derived from metadata stored within the principal server S 520; optionally, the electronic program guide EPG is customized to characteristics of the user profile metadata UMD, for example when the UMD specifies that the user U 610 is German speaking, the electronic program guide EPG is provided in German and pertains substantially to German items of program content $P_F, P_A$. By such a selective electronic program guide EPG, it is feasible to limit an amount data that the principal server S 520, or another server of the network 500 tasked by the principal server 520 S with providing the electronic program guide EPG to the user U 610, has to provide to the user U 610, thereby avoiding exceeding data bandwidth restrictions at the principal server S 520. Selective generation of the electronic program guide EPG pursuant to the user profile metadata UMD is executed by metadata matching between metadata associated with the program content $P_F$ and that of the user profile metadata UMD. Such metadata matching will be elucidated in more detail later and enables program content lists in the electronic program guide EPG to be presented via the user node 600 to the user U 610 in an order to potential relevance to assist the user U 610 with selecting program content $P_F$ most likely to be of interest; the electronic program guide EPG beneficially includes principal channels, ad-hoc channels which can be user modified and/or user created, and in-fill advertising channels. For example, the electronic program guide EPG can be determined, for example, in respect of one or more of:

(a) name of principal actor;

(b) name of film producer;

(c) name of film title;

(d) year of release to television, cinema, satellite or cable networks;

(e) nature of the program content, for example documentary, news, sport, comedy, pornographic, wildlife, pop music, classical music;

(f) language of the program content, for example German, Japanese, Korean; and (g) presumed age-group to which the program content $P_F$ is likely to appeal.

Optionally, the aforesaid electronic program guide EPG is presented to the user U 610 as screen icons or as lists of potentially relevant program content to the user U 610 based on the user profile Z. More optionally, the electronic program guide EPG is presented as a multiplicity of channels amongst which the user U 610 is able to select in a manner akin to channels in contemporary broadcast television. On receiving the electronic program guide EPG, the user U 610 selects program content which the user U 610 is desirous to consume and sends such selection as a request REQ to the principal server S 520. The principal server S 520 then, in response to receiving the request REQ, sends the aforementioned cue list Q back to the user U 610. The cue list Q is beneficially generated at the principal server S 520 from one or more channel templates which are then customized, namely populated, with program content likely to be of relevance or interest to the user U 610 as will be elucidated in more detail below.

The cue list Q includes a list of encrypted data blocks B 700 corresponding to the request REQ, the list preferably being in a sequence corresponding to its temporal execution; the cue list Q includes thus a list of aforementioned data blocks $B_R$ to be requested by the user node 600. Moreover, the principal server S 520 is operable to perform the aforesaid matching of advertising program data $P_A$ metadata 730 with the user profile Z, namely the user profile metadata UMD, and include a list of data blocks B corresponding to advertisements likely to be interest to the user U 610, namely advertisements specifically targeted to the user U 610; such targeted advertising is in stark contradistinction to conventional broadcast television wherein advertisements are included irrespective of characteristics of viewers. The principal server S 520 is thus also able to determine a manner in which the advertisements are to be presented to the user U 610, for example before and/or after film program content $P_F$ requested in the request REQ, and/or interspersed within one or more sections of the film program content $P_F$ requested. Optionally, the principal server S 520 includes within the cue list Q a complement of all likely relevant advertising program content $P_A$ for the user 610 which the user node 600 is operable to select or reject locally based upon execution of the code 740 included in the data blocks $B_R$ requested. The cue list Q may, for example, contain definitions for data blocks B 700 which are subject to payment from the user U 610; such payment can be made by the principal server S 520 cancelling a certain number of the aforesaid tokens T allocated to the user U 610. Alternatively, or additionally, the cue list Q includes data blocks B 700 for which no payment is necessary, namely cost-free to the user U 610.

The user node 600 receives the cue list Q from the principal server S 520 and then proceeds to interpret the cue list Q. In interpreting the cue list Q, the user node 600 sends out requests to the nodes N 540, for example to the supernodes thereof, for the data blocks $B_R$. The nodes N 540 substantially in parallel, without causing data load to the principal server S 520, search for the requested data blocks $B_R$, and then report to the user node U 600 whereat the data blocks $B_R$ are stored so that the user node U 600 can then specifically request from nodes N 540 whereat the data blocks $B_R$ are stored to send the data blocks $B_R$ via the Internet 510 to the user node 600 whereat they are stored in one or more data buffers or data storage of the user node 600. Thereafter, optionally concurrently to receiving the requested data blocks $B_R$ from the nodes N 540, the application software AS executing upon computing hardware of the user node 600 decrypts the received data blocks $B_R$ 700 using suitable keys provided to the user U 610 to generate decrypted program content for consumption by the user U 610. Decryption optionally occurs real-time at a time of consumption of the program content by the user U 610.

Such a manner of providing program content $P_F$, $P_A$ to the user node 600 via the nodes N 540 is highly beneficial in that the principal server S 520 does not need to stream program content in real time as required in known conventional cable television systems. Such a manner of operation considerably reduces a computation workload experienced by the principal server S 520. Moreover, delivery of data blocks B from the principal server S 520 to the nodes N 540 is beneficially implemented during periods when the Internet 510 is more lightly loaded, for example at night-time.

The network 500 is optionally provided with a purging function to prevent data storage of the nodes N 540 become progressively saturated with data blocks B 700 delivered from the principal server S 520 to the nodes N 540. For example, the nodes N 540 are operable to store each data block B 700 received thereat for a certain time interval before deleting the received data block B 700 from their data storage. Optionally, if a given one or more data blocks B 700 are accessed frequently by users U, the data blocks B 700 are preferentially not purged from the nodes N 540. Yet more optionally, the code 740 associated with each data block B 700 includes information instructing the nodes N 540 to retain the data block B 700 in data storage for a defined time interval and/or until a defined end date. More optionally, the received data blocks B 700 are deleted from data storage of the nodes N 540 after the received data blocks B 700 have been accessed by users U a defined number of times.

Beneficially, the nodes N 540 are operable to monitor and record a number of times given data blocks B 700 are accessed, especially when such data blocks B 700 relate to advertising program content $P_A$. Such monitoring and recording is beneficial in that the nodes N 540, for example the supernodes thereat, are able to execute one or more of:

(a) providing the principal server S 520 with statistical information regarding presentation of advertisement program content $P_A$ to users U, such statistical information being subsequently reported to advertisers paying for their advertising program content $P_A$ to be shown to the users U via the network 500, and/or to film content providers providing the film program content $P_F$ to the network 500;

(b) collating via the application software AS executing in the computing hardware of the user node 600 statistical information on which data blocks B corresponding to advertisement program content $P_A$ and/or film program content $P_F$ have been viewed by the user U 610, such statistical information being communicated anonymously either directly to the principal server S 520 or via the nodes N 540 to the principal server S 520; and (c) providing the principal server S 520 with statistical information regarding response of the users U to advertisement program content $P_A$, for example statistical information when viewing of given advertisements has been skipped or actively avoided by the users U, when viewing of given advertisements have been actively requested by the users U, and when viewing of given advertisements has been passively watched by the users U.

The principal server S 520 is thereby capable of providing statistical reports of advertising effectiveness or exposure directly to advertisers paying for advertisement program content $P_A$ to be presented via the network 500 and therefore enabling the effectiveness of advertising campaigns to be assessed on a substantially real-time basis.

Optionally, the electronic program guide EPG as processed via the application software AS executing on the computing hardware of the user node 600 is presented to the user U 610 as one or more channels between which the user U 610 can select, namely in a manner akin to known conventional television broadcasting systems. Yet more optionally, the application software AS is operable, via for example an Application Programming Interface API, to allow the user U 610 to upload the user's program content 620 together with its metadata to the principal server S 520. Such uploading of the data content 620 is optionally subject to a payment from the user U 610 to the principal server S 520, for example in a situation wherein the program content 620 corresponds to private advertisement material, for example classified small advertisements. The persons responsible for operation of the principal server S 520 are beneficially operable to review the program content 620 submitted by the user U 610 for ensuring that the metadata provided by the user U 610 is consistent with the program content 620 subject matter, and also that the program content 620 is of nature that it can respectfully be propagated within the network 500; for example, the persons responsible for the network 500 are able to potentially hinder propagation of the program content 620 which is susceptible to causing incitement to criminal activities and such like.

The cue list Q provided to the user U 610 is capable of enabling the user U 610 via the application software AS to review the requested program content REQ, namely the requested data blocks $B_R$, in fast-forward, fast-reverse, forward, reverse, and stop modes akin to a conventional video recorder.

Optionally, in an event that a requested data block $B_R$ included in the cue list Q is not found at any of the nodes N 540 by their associated supernodes, the application software AS is operable in such a situation to send a request directly to the principal server S 520 for the requested data block $B_R$. In response, the principal server S 520 executes at least one of the following operations:
(a) the principal server S 520 streams the unobtainable requested data block $B_R$ directly to the user node 600 for substantially immediate consumption thereat; and
(b) the principal server S 520 outputs the unobtainable requested data block $B_R$ to one or more of the nodes N 540 and then informs the user node 600 of the identity of the one or more nodes N 540 whereat the requested data block $B_R$ has now become available.

Optionally, whilst awaiting availability of the formerly unavailable data block $B_R$, the application software AS can present data blocks B 700 corresponding to advertising data content $P_A$ to the user U 610 and/or a message that data blocks are being fetched and short delay is likely to be encountered; such presentation during the short delay is known as "infilling".

Optionally, the principal server S 520 is operable to propagate duplicate data blocks B 700 within the network 500 in response to estimated frequency of access by users U. For example, data blocks B 700 corresponding to sports coverage program content are beneficially duplicated to more nodes N 540 at weekends in comparison to data blocks B 700 corresponding to obscure documentary films. Such selective distribution of duplicate data blocks B 700 enables data supply overload occurring at the nodes N 540 to be circumvented. Yet more optionally, in an event of given program content $P_A$, $P_F$ become unexpectedly very popular, for example a given amusing advertisement or comedy film, the nodes N 540 are optionally operable to propagate corresponding data blocks B 700 to other nodes N 540 of the network 500 so that data supply overload from the nodes N 540 to users U does not occur and that a high quality of service to users U is thereby provided.

As elucidated in the foregoing, the application software AS executable at the user node U 600 is beneficially synergistically capable of accessing other services available on the Internet 510, for example one or more of: voice over Internet Protocol (VoIP), instant messaging, electronic product auctioning such as provided by E-bay, banking services such as Pay-Pal, and user directories capable of bring the user U 600 into contact with other users U of the network 500. Such user contacts are beneficially not monitored or recorded at the principal server S 520 so as to respect privacy and anonymity of the users U of the network 500. As elucidated in the foregoing, the user profiles Z, as represented in the user metadata UMD, do not include actual names and postal addresses of the users U thereby ensuring their anonymity.

In customizing presentation of the advertisement program content $P_A$ to the user U 610, the principal server S 520 is operable to perform metadata matching as will now be elucidated in further detail. In overview, such metadata matching involves determining one or more Euclidean distances E between one or more terms present in user profile metadata UMD corresponding to the aforesaid user profile Z and one or more terms present in film program content metadata FMD corresponding to the film program content $P_F$ and/or advertisement program content metadata AMD corresponding to the advertisement program content $P_A$; the one or more Euclidean distances are summated in order to determine a total value of a matching factor $MF_T$. Computation of the one or more Euclidean distances E optionally involves filtering the metadata UMD, FMD, AMD to remove terms imparting negligible information followed by a translation step, for example to an abstract conceptual language domain wherefrom the one or more Euclidean distances E are determined. Moreover, the computation also involves filtering incorrectly spelt terms by substituting them with correspondingly correctly spelt terms. In an event of the total value of matching factor $MF_T$ exceeding a given threshold $T_H$, an association is deemed to have been made. When the association concerns film program content $P_F$, a recommendation, for example in the aforesaid electronic program guide (EPG), is optionally made to the user 610 based on substantially a matching factor $MF_{FZ}$. Conversely, when the association concerns advertisement program content $P_A$, the advertisement program content $P_A$ is beneficially presented to the user U 610 at a suitable instance based on at least one of matching factors $MF_{AZ}$, $MF_{FZ}$. The suitable instance depends upon a nature of film program content $P_F$ to be presented to the user U 610 in close temporal proximity to the advertisement program content $P_A$. Thus, matching of film program content $P_F$ described by film metadata FMD to the user profile Z described by the user metadata UMD is defined by Equation 1 (Eq. 1):

$$MF_{FZ} = \frac{\sum_{i=1}^{m}\sum_{j=1}^{n}(E_{i,j})}{N_F(m,n)} \qquad \text{Eq. 1}$$

wherein
$MF_{FZ}$=matching factor when associating film program content $P_F$ with the user profile Z;
$N_F$=normalizing factor dependent upon number of terms m in the metadata FMD describing the film program content $P_F$, and upon number of terms n in metadata UMD describing the user profile Z;
$E_{i,j}$=Euclidean distance between $i^{th}$ term of the metadata FMD describing the film program content $P_F$ and the $j^{th}$ term of the metadata UMD describing the user profile Z.

Similarly, matching of advertising program content $P_A$ described by advertisement metadata AMD to the user profile Z described by the user metadata UMD is defined by Equation 2 (Eq. 2):

$$MF_{AZ} = \frac{\sum_{i=1}^{p}\sum_{j=1}^{n}(E_{i,j})}{N_F(p,q)} \qquad \text{Eq. 2}$$

wherein $MF_{AZ}$=matching factor when associating advertisement program content $P_A$ with the user profile Z;

$N_F$=normalizing factor dependent upon number of terms p in metadata AMD describing the advertisement program content $P_A$, and upon number of terms n in metadata UMD describing the user profile Z;

$E_{i,j}$=Euclidean distance between $i^{th}$ term of the metadata AMD describing the advertisement program content $P_A$ and the $j^{th}$ term of the UMD metadata describing the user profile Z.

Similarly, matching of advertising program content $P_A$ described by advertisement metadata AMD to the film program content $P_F$ described by the film metadata FMD is defined by Equation 3 (Eq. 3):

$$MF_{AF} = \frac{\sum_{i=1}^{p}\sum_{j=1}^{n}(E_{i,j})}{N_F(p,q)} \qquad \text{Eq. 3}$$

wherein $MF_{AF}$=matching factor when associating advertisement program content $P_A$ with the film program content $P_F$;

$N_F$=normalizing factor dependent upon number of terms p in metadata AMD describing the advertisement program content $P_A$, and upon number of terms n in metadata FMD describing the film program content $P_F$;

$E_{i,j}$=Euclidean distance between $i^{th}$ term of the metadata AMD describing the advertisement program content $P_A$ and the $j^{th}$ term of the FMD metadata describing the film program content $P_F$.

A matching of advertisement program content $P_A$ to both the user profile Z and the film profile data $P_F$ can be derived from a function F having the matching factors $MF_{FZ}$, $MF_{AZ}$, $MF_{AF}$ as input parameters thereto as described by Equation 4 (Eq. 4) delivering the total value of matching factor $MF_T$:

$$MF_T = F(MF_A, MF_F, MF_{AF}) \qquad \text{Eq. 4}$$

In its simple implementation, the function F is a multiplication product or a summation product of one or more of its input parameters, namely one or more of the matching factors $MF_{AZ}$, $MF_{FZ}$, $MF_{FA}$. In a more general case, the function F is implemented as a multi-term polynomial function with one or more of the matching factors $MF_{AZ}$, $MF_{FZ}$, $MF_{AF}$ being input parameters to such a multi-term polynomial. In an event of the matching factors $MF_{AZ}$, $MF_{FZ}$, $MF_{FA}$, and thus $MF_T$ computed from Equation 4 exceeding the aforementioned threshold $T_H$, associations are deemed to have occurred. Conversely, when the matching factors $MF_{AZ}$, $MF_{FZ}$, $MF_{FA}$ and thus and thus $MF_T$ are less than the threshold $T_H$, associations are deemed not to have occurred. Optionally, computation of the total value of matching factor $MF_T$ can employ any one of more of the matching factors $MF_A$, $MF_F$, $MF_{AF}$, namely it is not always necessary for the series of processing steps 800 to compute all of the matching factors in computing the total value of matching factor $MF_T$.

Figure 4:
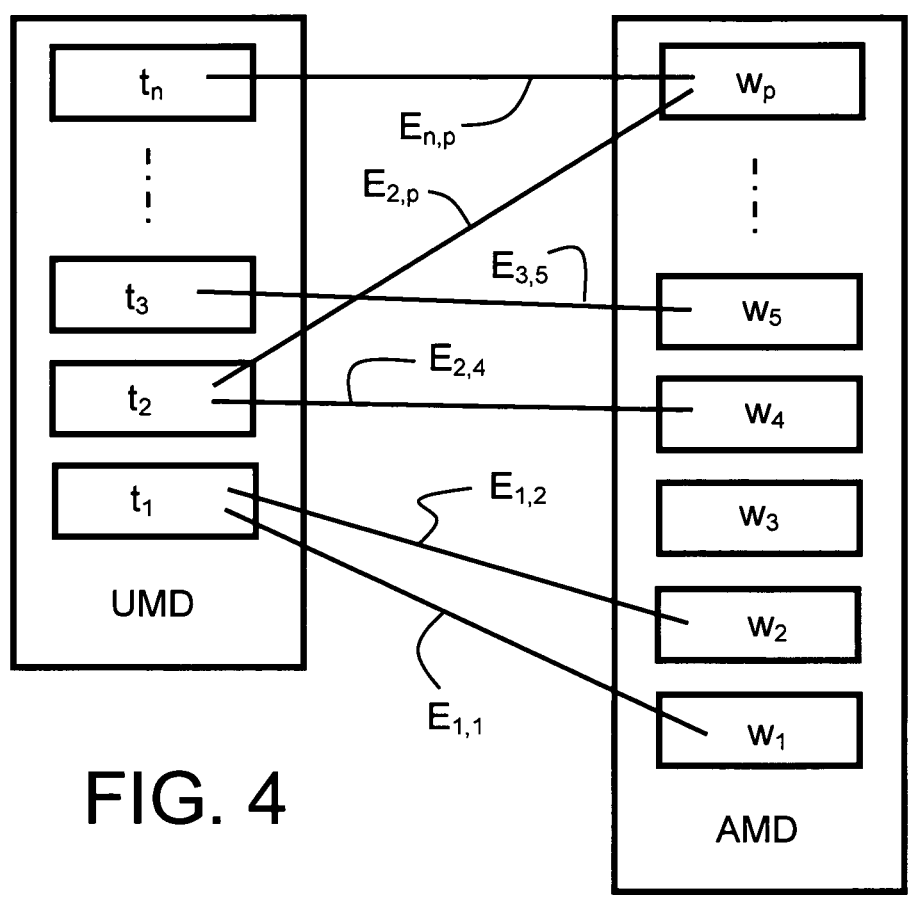
FIG. 4 is a schematic illustration of Euclidean distances between metadata terms.

In FIG. 4, there is shown a representation of some of the aforesaid Euclidean distances $E_{i,j}$ required for determining the matching factor $MF_{AZ}$. A similar representation for the matching factor $MF_{FZ}$ can also be constructed. Terms $t_1$ to $t_n$ in the user metadata UMD are a sub-set of key information-bearing words which are filtered from a total complement of words present in the user metadata UMD. Similarly, terms $w_1$ to $w_p$ in the advertisement program content metadata AMD are a sub-set of key information-bearing words which are filtered from a total complement of words present in the advertisement metadata AMD. Such filtering beneficially includes one or more spell checks for checking for mis-spelt terms or words. Moreover, such filtering can optionally be performed in one or more of the following ways:

a) by comparing terms present in the unfiltered metadata against a set of terms deemed to bear relatively little information, for example common prepositions such as "to", "in", "for" as well as common words such as "is", "are", "have" and so forth; and (b) by performing a translation so that two sets of metadata are in a similar language before computation of Euclidean distances E is executed; optionally, such translation is to an abstract conceptual language, namely not a natural language spoken by human beings, from which the Euclidean distances E are computed.

The Euclidean distances E are not real spatial distances but rather effectively a probability of association; for example, a term "horse" may have a shorter Euclidean distance (namely higher probability of association) to a term "pony" than to a term "arachnid", whereas a term "motorbike" may have a relatively longer Euclidean distance (namely lower probability of association) to a term "food mixer" than to a term "wheel", and whereas "James Bond" may have a relatively shorter Euclidean distance (namely higher probability of association) to a term "sports car" than to "university academic".

The Euclidean distances E and their associated metadata terms are preferably maintained in a database associated with the principal server S 520 or otherwise accessible from an external database coupleable to the principal server S 520. Moreover, optionally, the database of Euclidean distances E and their respective metadata terms can remain substantially constant with time, namely not updated with time.

Figure 5:
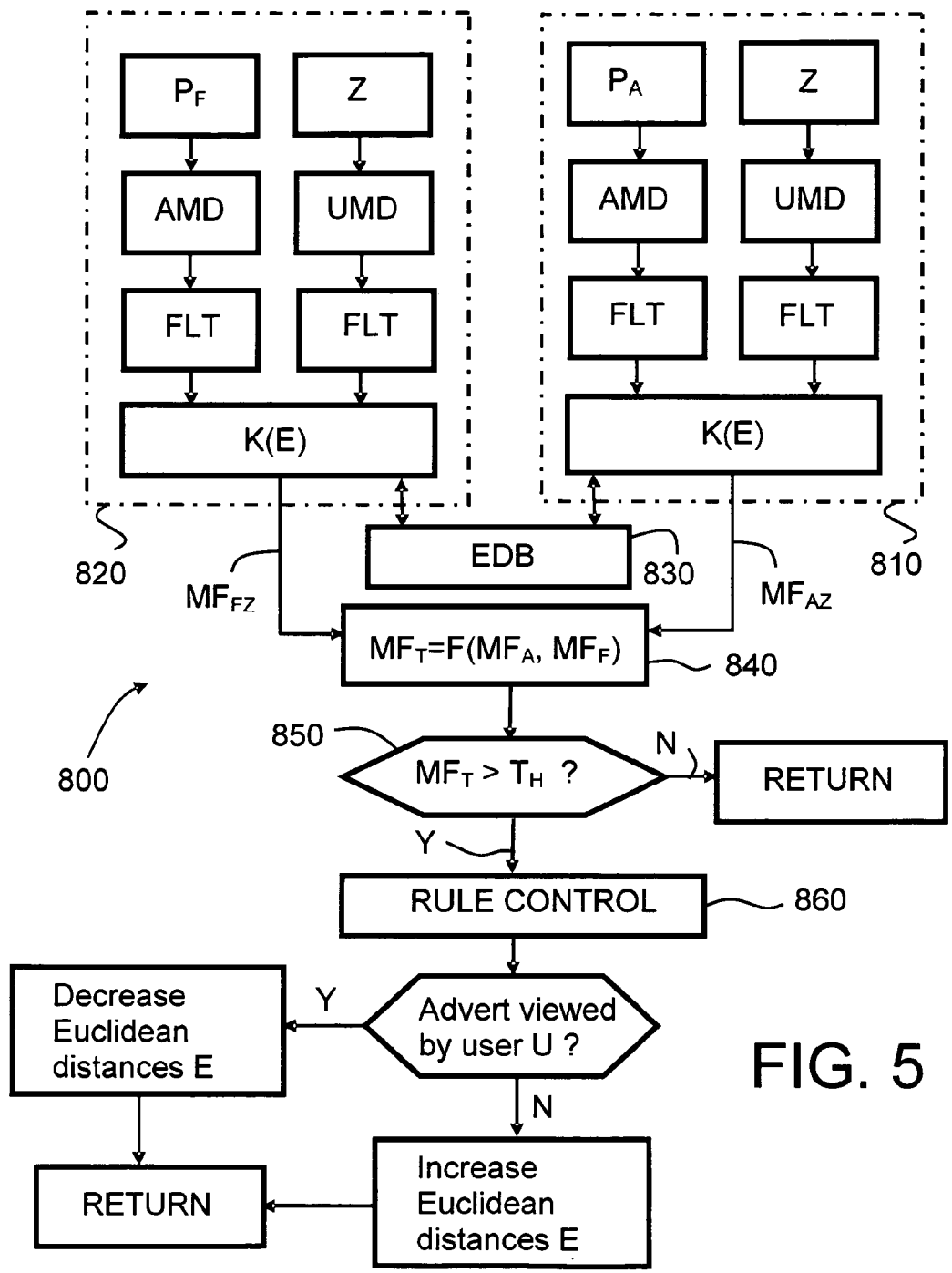
FIG. 5 is a schematic illustration of a metadata matching and feedback process for enhancing advertisement film program targeting to users U of the network of FIG. 2.

Alternatively, in an advanced implementation of the present invention, the Euclidean distances E are modified as a function of response of the user U 610 to being presented with advertisement program content $P_A$. In other words, in an event of the principal server S 520, when generating the aforesaid cue list Q to send to the user node 600, makes an unsuitable association of advertisement program content $P_A$ to the user profile Z, the user U 610 in being presented the advertisement program content $P_A$ elects to skip viewing the advertisement content $P_A$, the system 500 is operable to provide feedback to the principal server S 520 to marginally increase the Euclidean distances E linking filtered terms of the user profile metadata UMD to filtered terms of the advertisement program content metadata AMD, namely updating the aforesaid Euclidean distance database. Beneficially, such modification of the Euclidean distance database is performed in response to general aforesaid statistical information regarding advertising effectiveness collated within the network 500 for providing advertising effectiveness feedback to the advertisers responsible for providing the advertisement program content $P_A$ to the principal server S 520. Such a feedback mechanism is illustrated in FIG. 5. Optionally, in addition or as an alternative to modifying Euclidean distances as function of user U 610 responses, the principal server S 520 can modify the user profile Z stored thereat to obtain better matching of metadata terms.

Referring to FIG. 5, there is shown a series of operations indicated generally by 800 executable in the network 500 for modifying the aforesaid Euclidean distances E in a feedback manner to improve matching of advertisement program content $P_A$ to the user profile Z and to film program content $P_F$. The series of operations 800 comprise a first function 810 performed at the principal server S 520 to compute a matching factor $MF_{FZ}$ of film program content $P_F$ in relation to the user profile Z, the function 810 referring to Euclidean distances E stored in a Euclidean distance database EDB 830; the function 810 includes filters FLT for filtering metadata terms conveying negligible information and/or performing a language translation as elucidated earlier and/or performing a spelling correction function. Moreover, the series of operations 800 comprise a second function 820 also performed at the principal server S 520 to compute a matching factor $MF_{AZ}$ of advertisement program content $P_A$ in relation to the user profile Z, the function 820 also referring to Euclidean distances E stored in a Euclidean distance database EDB 830; similarly, the function 820 includes filters FLT for filtering metadata terms conveying negligible information and/or performing a language translation as elucidated earlier and/or performing a spell check and spelling correction. The matching factors $MF_{FZ}$, $MF_{AZ}$ are then merged in a step as denoted by 840 using the function F of Equation 4 to generate the total value of matching factor $MF_T$. In a function 850, the total value of matching factor $MF_T$ is compared with the aforementioned threshold $T_H$. In an event that the total matching factor $MF_T$ is equal to or less than the threshold $T_H$, namely route "N", a match of metadata is deemed not to have been found and the advertisement program content $P_A$ is then not included in the cue list Q and a return to other computation tasks is then performed in the principal sever S 520; conversely, in an event that the total matching factor $MF_T$ is greater than the threshold $T_H$, namely route "Y", a match of metadata is deemed to have been found and the principal server S 520 is then operable to include the program content $P_A$ in the cue list Q subject to rule control denoted by 860 concerning suitable placement of the advertisement program content $P_A$. The rule control 860 takes into account, for example, one or more of the following:

(a) requirements that the providers of the film program content $P_F$ have imposed on the persons operating the network 500 regarding circumstances in which the film program content $P_F$ can be shown; for example, the film program content $P_F$ is not to be shown in conjunction with advertisements for underwear to protect the moral integrity of the film producer involved with directing original production of the film program content $P_F$;

(b) requirements that the advertisers providing the advertisement program content $P_A$ have imposed on the persons operating the network 500 regarding circumstances in which their advertisements can be shown; for example, advertisement program content $P_A$ of a first drinks manufacturer is not to be shown in near conjunction with advertisements of a second drinks manufacturer, the first and second drinks manufacturers being mutually aggressive competitors;

(c) requirements that the advertisers providing the advertisement program content $P_A$ have imposed on the persons operating the network 500 regarding times of day during which their advertisements can be shown, for example between 8 a.m. and 10 a.m. at weekends only;

(d) requirements that the advertisers providing the advertisement program content $P_A$ have imposed on the persons operating the network 500 regarding presentation of the advertisements depending upon certain events having occurred; for example, to present adverts for football merchandise for an Amsterdam football team in an event of Holland winning the World Cup, such advertisements being limited to presentation to users U based in Holland.

(e) geographical location of the user U 610; for example, the advertisement concerns a restaurant which is to be advertised to persons resident, as stipulated in the metadata UMD of the user profile Z, within 10 km of the restaurant; and (f) characteristics of the user U 610; for example, when the user U 610 is declared in the user metadata UMD of the user profile Z to be a man, not to present advertisements relating to women's underwear. Other basis for the rule control 860 is described earlier.

Other basis for the rule control 860 is described earlier.

When a metadata match is identified at the function 850, identifiers for corresponding data blocks B are included in the list Q being generated at the principal server S 520; on completion, the cue list Q is then sent to the user U 610. As elucidated in the foregoing, the user U 610 is operable to obtain film program content $P_F$ and advertisement program content $P_A$ from the nodes N 540 of the network 510 as identified in the cue list Q.

When executing the cue list Q received at the user node U 600 to present program content to the user U 610, the user node 600 receives data blocks $B_R$ at the user node 600, and then stores them in its data store or memory. The user node 600 is operable to fetch the data blocks. $B_R$ 700 to check whether or not the data blocks $B_R$ 700 can be presented to the user U 610 based upon rules included in the code 740 included within the data blocks $B_R$ 700, for example in response to an ambient temperature in the user U's environs exceeding 25° C.

In a step denoted by 860, the user node 600 is operable to record one or more responses of the user U 610 to being presented the advertisement program content $P_A$ conveyed in the data blocks $B_R$ supplied in response to executing the cue list Q. The response is preferably recorded as one of:

(a) passive acceptance of the advertisement program content $P_A$, namely the user U 610 does not take action to avoid watching the advertisement program content $P_A$ manifest in the advertisement program content $P_A$ being shown uninterrupted at the user node 600; in such case, the Euclidean distances E used in matching in computing the total matching factor $MF_T$ are nominally representative and do not need adjustment in the Euclidean distance database EDB 830;

(b) active avoidance of the advertisement program content $P_A$ by the user U 610, namely the user U 610 presses a fast-forward control button at the user node 600 to deliberately skip the advertisement program content $P_A$ because the advertisement program content $P_A$ has been potentially incorrectly assessed to be a match to the user profile Z and/or film program content $P_F$; in other words, Euclidean distances E employed in computing the matching factor $MF_T$ are potentially too short, namely have unrepresentatively high probability in the Euclidian distance database EDB 830;

(c) active acceptance of the advertisement program content $P_A$, namely the user U 610 is obliged to press a given button on the user node 600 to be presented with the advertisement program content $P_A$; in such a situation where the user U 610 presses the button, the advertisement program content $P_A$ is deemed to have been so well matched to the user profile Z and/or the film program content $P_F$ that the user U 610 is motivated out of interest to take action to view the advertising program content $P_A$; in other words, Euclidean distances E employed in computing the matching factor $MF_T$ are potentially too long, namely have unrepresentatively low probability in the Euclidian distance database EDB 830, such that the advertisement program content $P_A$ should have been presented to the user U 610 without the user U 610 needing to take any active steps to view the advertisement program content $P_A$. Beneficially, the advertisement program content includes a "teaser" followed by presenting the user U 610 with a selection option to which the user U 610 is required to provide a response, for example depressing a button to see more details.

Such responses (a) to (c) to presentation of advertisement program content $P_A$ are preferably recorded as statistical data for many users U and not identifiable to any specific user U 610, thereby ensuring the user U's anonymity within the network 500. Moreover, such responses from one or more users U are either communicated directly to the principal server S 520, or collated and then communicated from the network nodes N 540 to the principal server S 520. The principal server S 620 is then operable to incrementally adjust the Euclidean distances E linking terms, namely words, present in the metadata AMD, UMD, FMD employed in computing the matching factor $MF_T$ in response to behavior of the users U to aforesaid advertisement program content $P_A$. As elucidated earlier, the user profile Z stored at the principal server S 520 is also susceptible to being modified to improve matching accuracy.

The series of operations 800 can be modified so that a match is only established between the user profile Z and the film program content $P_F$ for purposes of generating an electronic program guide EPG to the user U 610 from the principal server S 520; in other words the matching factor $MF_{FZ}$ is primarily used for generating the total value of matching factor $MF_T$ for comparing with the threshold $T_H$. In such a situation where matching to advertisement program content $P_A$ is not required for generating an electronic program guide EPG customized to the user U, the functions 820, 840 are then not invoked.

The network 500 is therefore capable of actively updating in an automatic feedback manner its Euclidean distance database EDB 830 to provide for a better targeted service to the user U 610. Such better targeting is susceptible to rendering the network 500 more enjoyable to utilize in comparison to contemporary broadcast UHF and satellite television services. Moreover, the network 500 is capable of functioning as a feedback self-optimizing tool for precisely targeting advertisements to users U in a manner hitherto not achieved in contemporary uni-directional digital television services. Moreover, such extraordinarily attractive performance is achieved in the network 510 with modest bandwidth on account of data blocks B 700 being propagated in a peer-to-peer manner therein. On account of its degree of automation, the network 500 is capable of targeting advertisements to the users U without a high input of human effort. However, the network 500 retains an option of targeting of advertisement program content $P_A$ being manually controlled, for example by manual amendment of advertisement metadata AMD, to address special requirements demanded by advertisers providing the advertisement program content $P_A$. Unlike other media conveying advertisements to users U, the network 500 is able to automatically collate statistical information regarding success of exposure of given advertisement program content $P_A$ to users U and thereby provide rapid reports of advertising campaign success to providers of the advertisement program content $P_A$.

Modifications to embodiments of the invention described in the foregoing are possible without departing from the scope of the invention as defined by the accompanying claims.

The series of operations 800 illustrated in FIG. 5 are susceptible to being further modified to refine a degree of matching achieved in the step 840 to determine sensitivities of Euclidean distances employed in computing the matching factors $MF_{AZ}$, $MF_{FZ}$, $MF_{AF}$ and hence the total value of matching factor $MF_T$. In practice, it is found that certain terms that are filtered and/or translated from metadata, for example from metadata UMD, FMD, AMD, and which are employed in determining Euclidean distances, can disproportionately contribute to computation of the matching factors $MF_{AZ}$, $MF_{FZ}$, $MF_{AF}$. Such disproportionate contribution can result in potentially less suitable automatic inclusion of the advertisement program content $P_A$ in the cue list Q or less suitable selection of film program content $P_F$ in electronic program guides (EPGs) presented to the user U 610. Beneficially, the step 840 can be further refined by computing a sensitivity to change as one or more of the filtered and/or translated metadata terms, for example one or more of the terms $t_1$ to $t_n$ and/or $w_1$ to $w_p$, are substituted with substantially equivalent terms as determined by an electronic Thesaurus or similar type of word equivalents database. Optionally, actual names are not subject to such identification of equivalent terms on account of names being specific to certain actors and so forth.

As an example, the advertisement metadata AMD may be initially in Danish language and include a term "knallert" and a term "og". The metadata AMD is translated to English so that terms "knallert" and "og" become translated by "moped" and "and" respectively. The filter FLT will remove the word "and" from the translated metadata on account of it being a commonly occurring word conveying relatively little useful information for matching purposes. The matching factor value $MF_{AZ}(1)$ is then computed using the metadata "moped" and other filtered and/or translated metadata terms derived from the advertisement metadata AMD in conjunction with the translated and/or filtered user metadata UMD by way of Euclidean distances E as elucidated in the foregoing. By referring to an electronic Thesaurus or similar database, an equivalence for the term "moped" is then identified, for example "scooter" or "small motorcycle", and then the matching $MF_{AZ}(2)$ is recalculated. One or more recalculations of the advertisement matching factor $MF_{AZ}(1)$ to $MF_{AZ}(k)$, wherein k is an integer denoting the number of recalculations, can be performed and one or more of the following subsequent steps implemented as follows:

(a) an average of the original computed matching match $MF_{AZ}(1)$ and the recalculated match factors $MF_{AZ}(2)$ to $MF_{AZ}(k)$ can be computed and used in Equation 4 to determine the total matching factor $MF_T$ for use in the step 850;

(b) in a situation wherein the matching factors $MF_{AZ}(1)$ to $MF_{AZ}(k)$ mutually differ by more than a threshold percentage value TP, for example TP=50%, the matching factor $MF_{AZ}$ value passed on the step 850 is deliberately set to a very low value or otherwise adjusted to force a return, namely the "N" option, from the step 850;

(c) in a situation wherein the matching factors $MF_{AZ}(1)$ to $MF_{AZ}(k)$ mutually differ by less than the threshold percentage value TP, for example TP=50%, the matching factor $MF_{AZ}$ value passed on to the step 850 is provided from a polynomial computation using the matching factors $MF_{AZ}(1)$ to $MF_{AZ}(k)$ as input parameters to provide a composite value of the matching factor $MF_{AC}$ to employ when computing the total matching factor $MF_T$ for step 850; such a composite match factor $MF_{AC}$ is preferably computed pursuant to Equation 5 (Eq. 5) wherein $v_1$ to $v_k$ are weighting factors:

$$MF_{AC} = v_1 MF_A(1) + v_2 MF_A(2) + \ldots v_k MF_A(k) \quad \text{Eq. 5}$$

Preferably, persons' names are not subject to such substitution of equivalent terms on account of the users U often desiring to seek an exact match in respect of such names, for example for electronic program guides (EPGs) based on actor name or film character name. Such refinements are, in mathematical terms, akin to determining partial derivatives of one or more of the matching factors $MF_{AZ}$, $MF_{FZ}$, $MF_{AF}$ and thus $MF_T$ in respect of metadata terms, for example $$\frac{\partial MF_A}{\partial t_1} \text{ or } \frac{\partial MF_A}{\partial t_n}.$$

As the meanings of words change, new film actors become known, politicians appear and disappear from political arenas, the Euclidean distance database 830 is not only updated with new terms linked by Euclidean distances but also the Euclidean distances E are updated in response to actions invoked by the user U 610. Such feedback:
(a) improves the ability of the network 500 to provide relevant and pleasing electronic program guides (EPG) to the user U 610 to entice the user U 610 to use to network 500 to a greater extent; and
(b) improves the ability of the network 500 to target advertisements to the user U 610 to the satisfaction of advertisement program content providers interacting with the principal server S 520 and the persons responsible therefore.

Although dynamic modification of the aforesaid Euclidian distances E is described in the foregoing in response to statistical information gathered from user responses, it will be appreciated that at least one of the user metadata UMD, the film program content metadata FMD and the advertisement program content metadata AMD is susceptible to being modified in a feedback in response to statistic information gathered from several user responses, preferably many users so that a general trend can be established. Thus, one or more of Euclidian distances and metadata can be modified to obtain better matching. Such better matching can, for example, be achieved by applying a perturbation to a term present in advertisement metadata AMD and then observing a corresponding change in user response; in an event of a perturbation of metadata enhancing user response and hence user exposure of the corresponding advertisement program content $P_A$, the principal server S 520 can provide feedback to the advertisement program content provider to seek permission to modify the advertisement program content metadata AMD; alternatively, for example subject to general approval from the advertisement program content $P_A$ provider, the principal server S 520 can automatically iterate the advertisement program content metadata AMD, for example by applying sequentially random perturbations in the advertisement meta data AMD and observe and analyze responses from many users U 610. A similar type of approach can be applied to refine matching for the user metadata UMD. Optionally, advertisement program content $P_A$ providers can specify whether or not its advertisement program content metadata AMD is permitted to be modified in the network 500 in such a manner of feedback.

Figure 6:
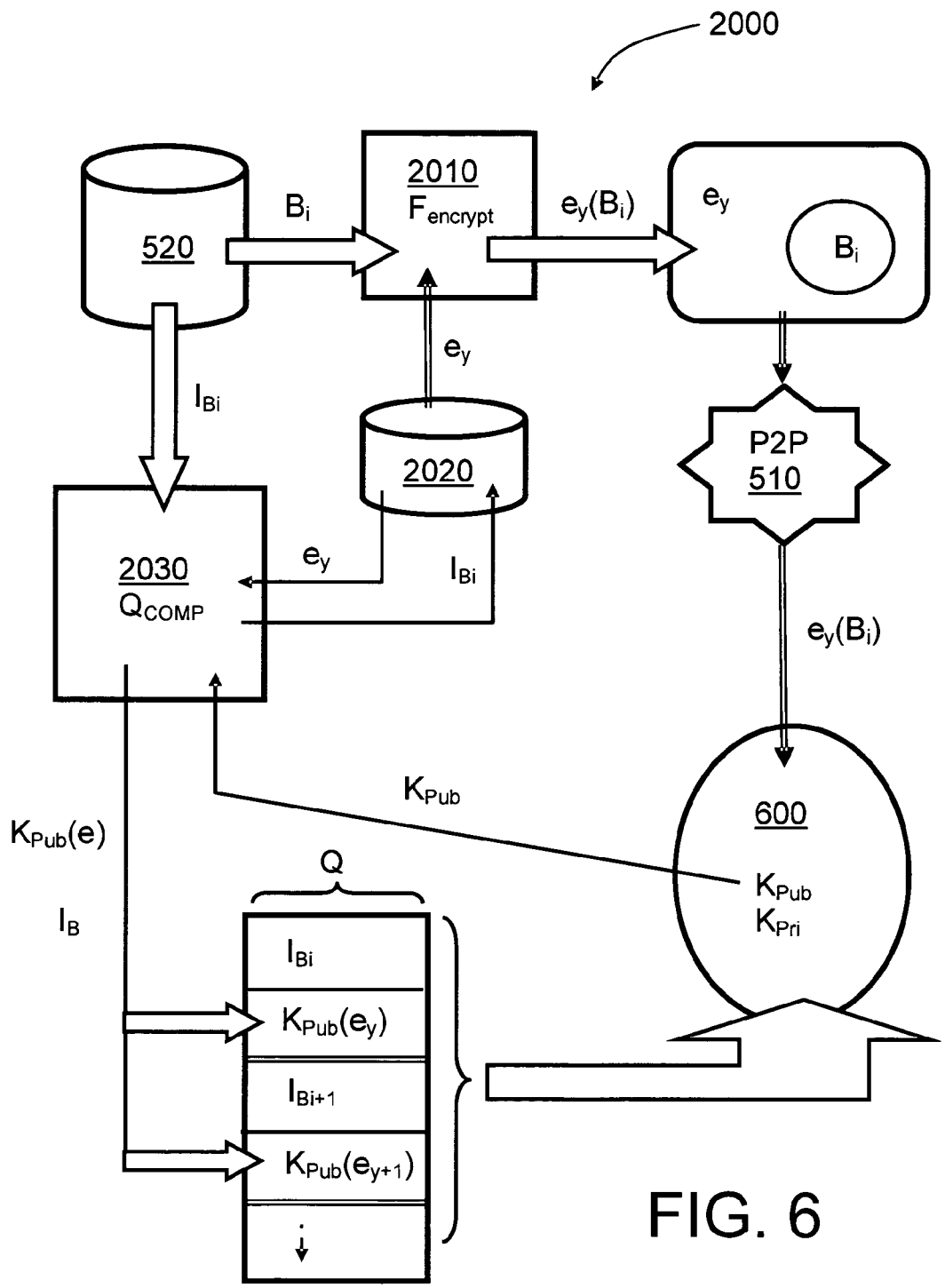
FIG. 6 is a schematic illustration of a method of encrypting and correspondingly decrypting data blocks B communicated within the digital television network of FIG. 2.

In the foregoing, encryption of the data blocks B 700 is elucidated in general overview. However, there are several mutually different encryption methods that can potentially be employed in the network 500. An especially beneficial method involves a mutually different password for encrypting the data blocks B 700 relative to the cue list Q. Referring to FIG. 6, there is shown a method indicated generally by 2000 illustrating encryption and decryption processes executed within the system 500. The network 500 includes an encryption key provider 2020, for example an additional server of the network 510, operable to generate one or more variants of an encryption key e. The encryption key e is an unpredictable number to third parties coupled to the network 510. Moreover, the network 500 includes a data block encryption unit $F_{encrpt}$ denoted by 2010 coupled in data communication with the principal server S 520 and the encryption key provider 2020. The network 500 further comprises a cue list generator $Q_{COMP}$ 2030 operable to generate one or more cue lists Q for sending to the user node 600.

In operation, the data block encryption unit 2010 is operable to receive one or more encryption keys $e_y$ wherein a parameter y is an integer index identifying a variant of the key e, from the key provider 2020 and apply the encryption keys $e_y$ to encrypt data blocks B 700 provided thereto from the principal server S 520 to generate corresponding encrypted data blocks $e_y(B_i)$ which are propagated within the network 510 as elucidated earlier in a peer-to-peer manner. The cue list generator 2030 is also operable to receive an identifier $I_{Bi}$ from the principal server S 520 and the encryption key $e_y$ used to encrypt the data block B 700 corresponding to the identifier $I_{Bi}$.

Figure 3:
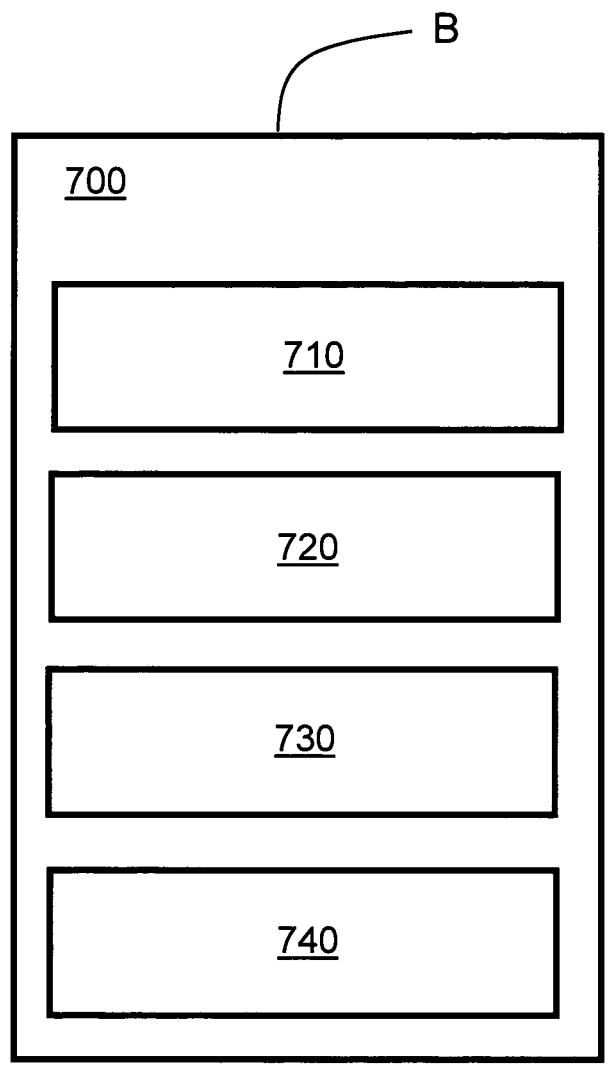
FIG. 3 is an illustration of decrypted component parts of data blocks B communicated within the network of FIG. 2.

Application software AS executing in the computing hardware of the user node 600 is operable to generate a complementary private-public key pair comprising a public key $K_{Pub}$ and a private key $K_{Pri}$. Optionally, the keys $K_{Pub}$, $K_{Pri}$ are "layered" as known in encryption systems design. The private key $K_{Pri}$ is maintained a secret at the user node 600, whereas the public key $K_{Pub}$ is communicated via the network 510 to the cue list generator 2030. In turn, the cue list generator 2030 is operable to generate the cue list Q to be a sequence of the identifiers $I_{Bi}$, namely component 710 as illustrated in FIG. 3, followed by the encryption keys $e_y$ employed in the encryption unit 2010 to encrypt data blocks B 700 corresponding to the identifiers $I_{Bi}$, wherein the encryption keys are encrypted in the cue list generator 2030 using the public key $K_{Pub}$. On receipt of the cue list Q at the user node 600, the user node 600 is operable to fully decrypt the Q list using the private key $K_{Pri}$. Without knowledge of the private key $K_{Pri}$, unauthorized third parties are not able to fully interpret the cue list Q. The user node 600 is thereby able to determine the variant of encryption key $e_y$ used to encrypt the data block $B_i$ corresponding to its identifier $I_{Bi}$ and thereby decrypted the encrypted data block $e_y(B_i)$ received in a peer-to-peer manner from the network 510 for consumption by the user U 610. Optionally, the encryption unit 2010, the encryption key provider 2020 and the cue list generator 2030 are substantially collocated with the principal server S. Alternatively, one or more of the encryption unit 2010, the encryption key provider 2020 and the cue list generator 2030 are function distributed within the network 510.

Multiple variants of the key e are utilized so that the network 500 as a whole is not compromised to hostile third parties should one variant of the key e become known. Optionally, in an event of a variant $e_x$ of the encryption key e being discovered by third parties, the network 500 is operable so that the encryption unit 2010 and the key provider 2020 cease using the variant $e_x$ to encode data blocks B 700 encoded by the variant $e_x$ to be progressively purged from the network 500 as elucidated in the foregoing.

Although methods of associated program content data in a digital television network is described in the foregoing, it will be appreciated that the methods are susceptible to being employed in other technical fields, for example in Internet search engines.

Although program content in the foregoing is employed to refer to advertisement program content $P_A$ and film program content $P_F$, it will be appreciated that the network 500 is also susceptible to distributing audio program content and executable software.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A method of associating program content data in a digital television network, the digital television network comprising: a program content source, and a network comprising at least one network node operable to receive data blocks corresponding to program content propagated from the program content source, wherein the program content propagated from the program content source to the at least one network node includes advertisement program content and/or film program content, and at least one user node coupled to the network, wherein the at least one user node is operable to receive program content information indicative of at least a sub-set of the data blocks propagated to the at least one network node, and the at least one user node is operable to receive program content corresponding to the sub-set of the data blocks from the at least one network node for presenting program content to one or more users of the at least one user node, the method comprising steps of:
   (a) receiving or determining one or more user profiles of the at least one user node;
   (b) matching the one or more user profiles with the program content for determining preferential program content for presentation to the one or more users, the preferential program content including preferential film program content, wherein the matching includes:
      (b)(1) determining said preferential film program content based on (i) film profile data associated with said preferential film program content, and on (ii) metadata information corresponding to at least one of said one or more user profiles; and,
      (b)(2) when the preferential program content includes preferential advertisement program content, determining said preferential advertisement program content based on (i) film profile data associated with said preferential film program content, and (ii) metadata information corresponding to said at least one of said one or more user profiles, and (iii) advertisement profile data associated with said preferential advertisement program content;
   (c) including identifiers of the preferential program content in the program content information;
   (d) procuring for the at least one user node the preferential program content using the identifiers from the at least one network node;
   (e) automatically selectively presenting at least part of the preferential program content to the at least one user node;
   (f) collating information indicative of delivery of the advertisement program content and/or the film program content via the plurality of network nodes to the at least one user node; and
   (g) reporting the information to one or more providers of the advertisement program content and/or the film program content, wherein the information includes anonymous statistical information relating to user responses to being presented with the advertisement program content, said statistical information including (x) information about which advertisement program content has been skipped by users, and (y) information about which advertisement program content has been requested by users,
   wherein the matching in (b) includes:
      (n) processing metadata information corresponding to at least one of the one or more user profiles and the program content to identify a degree of similarity therebetween, wherein the step (n) of processing metadata information includes:
         (n)(1) computing probabilities of association between terms included in the metadata information; and
         (n)(2) applying a processing function to the probabilities of association to compute a degree of matching for step (b),
   the method further including:
      (q) updating the probabilities of association between terms included in the metadata information in response to user response to being presented, or offered to be presented, with the preferential program content in step (e), and
      wherein the selectively presenting in (e) is based, at least in part, on one or more rules associated with the preferential program content.

2. A method as claimed in claim 1, wherein the data blocks are propagated in a substantially peer-to-peer manner within the network to the at least one network node.

3. A method as claimed in claim 1 or 2, wherein the data blocks propagated within the at least one network node are encrypted with mutually different encryption keys to one or more encryption keys employed to encrypt the program content information for communication to the at least one user node.

4. A method as claimed in claim 1, wherein the at least one network node includes supernodes, each supernode being coupled in communication with its one or more associated data storage nodes, wherein step (d) includes steps of:
   (h) communicating the identifiers from the at least one user node to the supernodes for determining which of the supernodes in conjunction with its one or more storage nodes are capable of providing program content corresponding to the identifiers to the at least one user node;
   (i) communicating one or more indications of which of the supernodes whose associated one or more data storage nodes are capable of providing the program content corresponding to the identifiers to the at least one user node;
   (j) communicating one or more requests from the at least one user node to the supernodes whose one or more data storage nodes are capable of providing the program content to the at least one user node; and
   (j) supplying from the supernodes and/or their one or more data storage nodes capable of providing the program content to the at least one user node, the program content corresponding to the one or more requests to the at least one user node.

5. A method as claimed in claim 1, wherein the network is implemented using the Internet.

6. A method as claimed in claim 1, including a step of:
(q) computing the probabilities from the terms in the metadata information subject to translation and/or filtering and/or spelling correction to remove terms bearing relatively insignificant information and/or to correct incorrectly spelled terms.

7. A method as claimed in claim 1, wherein the step (b)(1) of processing metadata information includes steps of:
(r) computing probabilities of association between terms included in the metadata information for computing a degree of matching; and
(s) repeating computation in step (r) using substantially equivalent terms to the terms included in the metadata to compute a degree of sensitivity of the degree of matching in respect of the terms included in the metadata; and
(t) applying a processing function to the probabilities of association and to the degree of sensitivity to compute a degree of matching for step (b).

8. A method as claimed in claim 7, wherein the equivalent terms are derived from an electronic Thesaurus and/or a spelling corrector.

9. A method as claimed in claim 1, wherein the step (g) of reporting includes:
(g1) reporting the information collated in (f) as at least one of:
substantially real-time report of an advertising campaign associated with the advertisement program content, film program content with which the advertisement program content is advantageously co-presented with for achieving enhanced user attention.

10. A method as claimed in claim 1, wherein, in step (a), the one or more user profiles of the at least one user node are communicated to the program content source, and the step (b) is executed substantially at the program content source.

11. A method as claimed in claim 10, wherein the one or more user profiles are prepared at the one or more user nodes using application software operable to generate the one or more user profiles using metadata terms selected from a defined set of metadata terms.

12. The method of claim 1 wherein said preferential program content includes preferential advertisement program content, and wherein said automatically selectively presenting in (e) comprises:
selectively presenting said preferential advertisement program content based on one or more rules associated with said preferential advertisement program content.

13. The method of claim 1 wherein the one or more rules associated with the preferential program content are included in code included within the preferential program content.

14. The method of claim 1 wherein the matching in (b) is based on:
(i) a first matching factor based on the preferential film program content and the user profile, and
(ii) a second matching factor based on the preferential advertisement program content and the user profile, and
(iii) a third matching factor based on the preferential advertisement program content and the preferential film program content.

15. A method of associating program content data in a peer-to-peer digital television network, the television network comprising: a program content source, a peer-to-peer network comprising at least one network node operable to receive data blocks corresponding to program content propagated from the program content source, and at least one user node coupled to the network, wherein the program content propagated from the program content source to the at least one network node includes advertisement program content and/or film program content, the method comprising steps of:
(a) receiving or determining one or more user profiles of the at least one user node;
(b) matching the one or more user profiles with the program content for determining preferential program content for presentation at the at least one user node, the preferential program content comprising preferential film program content, said preferential film program content being selected based on (i) film profile data associated with said preferential film program content, and on (ii) metadata information corresponding to at least one of said one or more user profiles; and, when the preferential program content also includes preferential advertisement program content, said preferential advertisement program content is determined based on (iii) film profile data associated with said preferential film program content, and on (iv) metadata information corresponding to said at least one of said one or more user profiles, and on (v) advertisement profile data associated with said preferential advertisement program content;
(c) including identifiers of the preferential program content in program content information;
(d) procuring for the at least one user node the preferential program content using the identifiers in the program content information from the at least one network node;
(e) automatically selectively presenting at least part of the preferential program content at the at least one user node, wherein the selectively presenting is based, at least in part, on one or more rules associated with the preferential program content, wherein the one or more rules associated with the preferential program content are included in code included within the preferential program content;
(f) collating information indicative of delivery of the advertisement program content and/or the film program content via the plurality of network nodes to the at least one user node, the information including user responses to being presented with the advertisement program content; and
(g) reporting the information to one or more providers of the advertisement program content and/or the film program content, wherein the information includes anonymous statistical information relating to user responses to being presented with the advertisement program content, said statistical information including information about which advertisement program content has been skipped by users.

16. A method as claimed in claim 15, wherein the at least one network node includes supernodes, each supernode being coupled in communication with its one or more associated data storage nodes, wherein step (d) includes steps of:
(h) communicating the identifiers from the at least one user node to the supernodes for determining which of the supernodes in conjunction with its one or more data storage nodes are capable of providing program content corresponding to the identifiers to the at least one user node;
(i) communicating one or more indications of which of the supernodes whose associated one or more data storage nodes are capable of providing the program content corresponding to the identifiers to the at least one user node;
(j) communicating one or more requests from the at least one user node to the supernodes whose one or more data storage nodes are capable of providing the program content to the at least one user node; and (k) supplying from the supernodes and/or their one or more data storage nodes capable of providing the program content to the at least one user node, the program content corresponding to the one or more requests to the at least one user node.

17. A digital television network operable to supply program content to one or more users, the digital television network comprising: a program content source, a network comprising at least one network node operable to receive data blocks corresponding to program content propagated from the program content source, and at least one user node coupled to the network, wherein the at least one user node is operable to receive program content information indicative of at least a sub-set of the data blocks propagated to the plurality of network nodes, and the at least one user node is operable to receive program content corresponding to the sub-set of the data blocks from the at least one network node for presenting program content to the one or more users of the at least one user node, wherein the program content propagated from the program content source to the at least one network node includes advertisement program content and/or film program content, and wherein the network is operable:

(a) to receive or determine one or more user profiles of the at least one user node;

(b) to match the one or more user profiles with the program content for determining preferential program content for presentation to the at least one user, wherein the preferential program content comprises preferential film program content, said preferential film program content being selected based on (i) film profile data associated with said preferential film program content, and on (ii) metadata information corresponding to at least one of said one or more user profiles; and, when the preferential program content includes preferential advertisement program content, said preferential advertisement program content is determined based on (iii) film profile data associated with said preferential film program content, and on (iv) metadata information corresponding to said at least one of said one or more user profiles, and on (v) advertisement profile data associated with said preferential advertisement program content;

(c) to include identifiers of the preferential program content in the program content information for receipt at the at least one user node;

(d) to procure for the at least one user node the preferential program content using the identifiers;

(e) to automatically selectively present at least part of the preferential program content to the at least one user node based, at least in part, on one or more rules associated with the preferential program content, wherein the one or more rules associated with the preferential program content are included in code included within the preferential program content; and (f) to collate information indicative of delivery of the advertisement program content and/or film program content via the at least one network node to the at least one user node; and (g) to report the information to one or more providers of the advertisement program content and/or the film program content, wherein the information includes anonymous statistical information relating to user responses to being presented with the advertisement program content, said statistical information including: (x) information about which advertisement program content has been skipped by users, and (y) information about which advertisement program content has been requested by users, wherein the network is operable to report the information to one or more providers of the advertisement program content and/or the film program content to the program content source as at least one of:

substantially real-time report of an advertising campaign associated with the advertisement program content, film program content with which the advertisement program content is advantageously co-presented with for achieving enhanced user attention, wherein processing metadata information involves:

(n) computing probabilities of association between terms included in the metadata information; and (o) applying a processing function to the probabilities of association to compute a degree of matching, and wherein the network is operable to update the probabilities of association between terms included in the metadata information in response to user response to being presented, or offered to be presented, with the preferential program content.

18. A digital television network as claimed in claim 17, wherein the data blocks are propagated in a peer-to-peer manner within the network to the at least one network node.

19. A digital television network as claimed in claim 17, wherein the network is implemented using the Internet.

20. A digital television network as claimed in claim 17, wherein the data blocks propagated within the at least one network node are encrypted with mutually different encryption keys to one or more encryption keys employed to encrypt the program content information for communication to the at least one user node.

21. A digital television network as claimed in claim 17, wherein the at least one network node includes supernodes, each supernode being coupled in communication with its one or more associated data storage nodes, wherein:

(h) the at least one user node is operable to communicate the identifiers to the supernodes for determining which of the supernodes in conjunction with their one or more data storage nodes are capable of providing program content corresponding to the identifiers to the at least one user node;

(i) the supernodes whose associated one or more data storage nodes are capable of providing the program content corresponding to the identifiers to the at least one user node are operable to communicate one or more indications thereof to the at least one user node;

(j) the at least one user node is operable to communicate one or more requests to the supernodes whose one or more data storage nodes are capable of providing the program content to the at least one user node; and (k) the supernodes and/or their one or more data storage nodes capable of providing the program content to the at least one user node, are operable to supply the program content corresponding to the one or more requests to the at least one user node.

22. A digital television network as claimed in claim 17, wherein the network is operable to compute the probabilities from the terms in the metadata information subject to translation and/or filtering and/or spelling correction to remove terms bearing relatively insignificant information and/or to correct incorrectly spelled terms.

23. A digital television network as claimed in claim 17, wherein the network is operable to process metadata information by:

(l) computing probabilities of association between terms included in the metadata information for determining a degree of matching; and (m) repeating computations in step (l) using substantially equivalent terms to the terms included in the metadata to compute a degree of sensitivity of the degree of matching in respect of the terms included in the metadata; and (n) applying a processing function to the probabilities of association and to the degree of sensitivity to compute a degree of matching for matching the one or more user profiles with the program content for determining preferential program content for presentation to the at least one user.

24. A digital television network as claimed in claim 23, wherein the equivalent terms are derived from an electronic Thesaurus and/or a spelling corrector.

25. A digital television network as claimed in claim 17, wherein the network is operable to communicate the one or more user profiles of the at least one user node to the program content source, and the program content source is operable to match the one or more user profiles with the program content for determining preferential program content for presentation to the at least one user.

26. A digital television network as claimed in claim 25, wherein the one more user profiles are prepared at the one or more user nodes using application software operable to generate the one or more user profiles using metadata terms selected from a defined set of metadata terms.

27. A software product embodied on a non-transitory computer-readable medium executable on computing hardware included with the digital television network as claimed in claim 17 for implementing the method as claimed in claim 1.

28. A peer-to-peer digital television network operable to supply program content to one or more users, the digital television network comprising a program content source, a network comprising at least one network nodes operable to receive data blocks corresponding to program content propagated from the program content source, and at least one user node coupled to the network, wherein the program content propagated from the program content source to the at least one network node includes advertisement program content and/or film program content, wherein the network is operable:

(a) to receive or determine one or more user profiles of the at least one user node;

(b) to match the one or more user profiles with the program content for determining preferential program content for presentation to the at least one user, wherein the preferential program content comprises preferential film program content, said preferential film program content being selected based on (i) film profile data associated with said preferential film program content, and on (ii) metadata information corresponding to at least one of said one or more user profiles; and, when the preferential program content also includes preferential advertisement program content, said preferential advertisement program content is determined based on (i) film profile data associated with said preferential film program content, and on (ii) metadata information corresponding to said at least one of said one or more user profiles;

(c) to include identifiers of the preferential program content in program content information;

(d) to procure for the at least one user node the preferential program content using the identifiers from the at least one network node;

(e) to automatically selectively present at least part of the preferential program content to the at least one user node, wherein the selectively presenting is based, at least in part, on one or more rules associated with the preferential program content, and wherein the one or more rules associated with the preferential program content are included in code included within the preferential program content;

(f) to collate information indicative of delivery of the advertisement program content and/or film program content via the at least one network node to the at least one user node, the information including user response to being presented with the advertisement program content and/or the film program content; and (g) to report the information to one or more providers of the advertisement program content and/or the film program content, wherein the information includes anonymous statistical information relating to user responses to being presented with the advertisement program content, said statistical information including information about which advertisement program content has been skipped by users.

29. A peer-to-peer digital television network as claimed in claim 28, wherein the at least one network node includes supernodes, each supernode being coupled in communication with its one or more associated data storage nodes, wherein:

(f) the at least one user node is operable to communicate the identifiers to the supernodes for determining which of the supernodes in conjunction with its one or more data storage nodes are capable of providing program content corresponding to the identifiers to the at least one user node;

(g) the supernodes whose associated one or more data storage nodes are capable of providing the program content corresponding to the identifiers to the at least one user node are operable to communicate one or more indications thereof to the at least one user node;

(h) the at least one user node is operable to communicate one or more requests to the supernodes whose one or more data storage nodes are capable of providing the program content to the at least one user node; and (i) the supernodes and/or their one or more data storage nodes capable of providing the program content to the at least one user node, are operable to supply the program content corresponding to the one or more requests to the at least one user node.

* * * * *